US 7,005,664 B2

(12) United States Patent
Mitchell et al.

(10) Patent No.: US 7,005,664 B2
(45) Date of Patent: Feb. 28, 2006

(54) METHOD AND APPARATUS FOR IMPROVED ENERGY READOUT

(75) Inventors: Christopher R. Mitchell, Pleasanton, CA (US); Jerel Smith, Boulder Creek, CA (US)

(73) Assignee: Alara, Inc., Fremont, CA (US)

( * ) Notice: Subject to any disclaimer, the term of this patent is extended or adjusted under 35 U.S.C. 154(b) by 0 days.

(21) Appl. No.: 10/999,318

(22) Filed: Nov. 29, 2004

(65) Prior Publication Data

US 2005/0167622 A1  Aug. 4, 2005

Related U.S. Application Data

(60) Provisional application No. 60/525,819, filed on Nov. 28, 2003.

(51) Int. Cl.
*G03B 42/08* (2006.01)
(52) U.S. Cl. ..................................... 250/585
(58) Field of Classification Search ................. 250/585
See application file for complete search history.

(56) References Cited

U.S. PATENT DOCUMENTS

| 4,527,061 | A  | * | 7/1985  | Horikawa et al. | .......... 250/585 |
| 4,689,482 | A  | * | 8/1987  | Horikawa et al. | .......... 250/205 |
| 5,801,391 | A  | * | 9/1998  | Arakawa et al.  | ............ 250/584 |
| 6,268,613 | B1 | * | 7/2001  | Cantu et al.    | ................ 250/584 |
| 6,326,628 | B1 | * | 12/2001 | Kimura et al.   | ........... 250/458.1 |
| 6,555,838 | B1 | * | 4/2003  | Livingston et al. | ......... 250/585 |
| 2005/0012057 | A1 | * | 1/2005 | Smith et al.    | ................ 250/588 |

* cited by examiner

*Primary Examiner*—Albert Gagliardi
(74) *Attorney, Agent, or Firm*—Heller Ehrman LLP

(57) ABSTRACT

Methods and device are provided for improved storage screen readout. In one embodiment, a storage screen readout device comprises a first wavelength source and a second wavelength source, means of collecting phosphorescence stimulated by the sources, and means of effecting relative motion between the sources and the screen in order to obtain image information. The first wavelength may be selected to pump signal on the screen to be more easily readout by said second wavelength source. The sources may direct energy sequentially onto the screen, simultaneously onto the screen, any combination of the two, or combinations with other sources.

33 Claims, 18 Drawing Sheets

METHOD AND APPARATUS FOR IMPROVED ENERGY READOUT

CROSS-REFERENCE TO RELATED APPLICATIONS

The present application claims the benefit of priority to U.S. Provisional Application Ser. No. 60/525,819 filed Nov. 28, 2003, now abandoned. This application is incorporated herein by reference for all purposes.

BACKGROUND OF THE INVENTION

1. Field of the Invention

This invention relates to radiographic imaging and more specifically to image data related to computed radiography (CR), digital radiography, and/or film-based radiography.

2. Description of Related Art

The use of photo-stimulable phosphor image storage screens as a replacement for X-ray film and other sensors is well known. Phosphor image screens work by trapping energy from individual X-ray photons in a storage layer, thus forming a latent image. The latent image can then be read by scanning the storage layer using a suitable wavelength excitation beam, typically from a focused laser. The excitation beam causes the screen to release the latent image in the form of emitted stimulable phosphor light that is proportional to the X-ray energy applied to the screen during exposure. The emitted light is collected by an optical system and is converted into an electronic signal proportional to the emitted light. The electrical signal is then converted into a digital value and passed to a computer that generates and stores an image file. The image file can then be displayed as a representation of the original radiograph, and manipulated with image enhancement software applied to augment the radiographic information.

The detection efficiency of a radiographic system is referred to as the Detective Quantum Efficiency, or DQE. Existing CR systems do not read out all of the energy stored in the latent image; this reduces the DQE of the system. If the readout efficiency, and thus the DQE, of CR systems can be improved, images of a given quality can be obtained using lower X-ray exposures to the patient. Conversely, for a given x-ray exposure to the patient, images of higher quality can be obtained.

The latent image is stored in a multiplicity of energy states; some of these are readily accessible using a single-wavelength readout beam. However, that same wavelength beam accesses states at other energy levels very inefficiently. Even if the power of the readout beam is significantly increased, much of the latent image will not be read out.

SUMMARY OF THE INVENTION

Accordingly, an object of the present invention is to provide systems that achieves better system DQE by more completely reading out the latent image from the storage phosphor plate or other image plates.

Another object of the present invention is to read out storage phosphor plates more quickly due to the greater efficiency of the readout.

Yet another object of the present invention is to reduce the power required to effectively readout storage phosphor plates.

At least some of these objects are achieved by some embodiments of the present invention.

In one embodiment of the present invention, a storage screen readout device comprises a pumping wavelength source and a readout wavelength source directed simultaneously at a given location on the screen. The two wavelengths may optionally originate in two separate sources, such as but not limited to lasers, laser diodes, or light-emitting diodes (LEDs) and be optically combined into a single optical path using combinations of lenses, mirrors, fiber optics, light pipes and or other optical components. Alternatively, the two sources may optionally be directed to a given location via independent paths. The image data are obtained by scanning the sources across the image screen and collecting and interpreting the stimulated emission from the screen.

In another embodiment of the present invention, a storage screen readout device comprises a pumping wavelength source and a readout wavelength source, that originate substantially at the same point in space and are directed simultaneously to a given location on the screen. As a nonlimiting example, such a multiple source might be provided by a multiple-wavelength laser or LED. The image data is obtained by collecting and interpreting the stimulated emission that occurs when the sources impinge on the screen.

In another embodiment of the present invention, the pumping wavelength(s) and readout wavelength(s) may optionally originate either from separate or substantially identical positions, be directed to the same, or nearly the same location on the storage screen, using independent or combined paths, with the light from the two wavelengths being delivered to the screen consecutively (rather than simultaneously) or any combination of consecutively and simultaneously. Because state transitions and light emission are very rapid, the time between the impingement of the pumping and readout wavelengths can be very short (or simultaneous). Also, because the energy remains in the storage states for long periods (up to days) if emission is not stimulated, substantial delays can be accommodated between exposures to the two wavelengths.

In another embodiment of the present invention, the pumping light and readout light may optionally be directed to different locations and at different times. For example, the pumping and readout beams could be implemented in separate scanning "heads" which separately irradiate the plate with either the pumping or readout wavelength(s) while collecting the stimulated phosphorescence. These "heads" could be arranged to follow one another in a patterned sequence. In one embodiment, the head or heads for the readout may be on one rotational frame while the head or heads for the pumping may be on another rotational frame.

In another embodiment of the present invention, the entire screen could be scanned using the pumping wavelength(s) followed by a scan using the readout wavelength(s).

In another embodiment of the present invention, the entire surface of the storage screen could be exposed to the pumping wavelength(s), without collecting image information, followed by a full scan using the readout wavelength(s).

A further understanding of the nature and advantages of the invention will become apparent by reference to the remaining portions of the specification and drawings.

DESCRIPTION OF THE SPECIFIC EMBODIMENTS

It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. Thus, for example, reference to "a material" may include mixtures of materials; reference to "an LED" may include multiple LEDs, and the like. References cited herein are hereby incorporated by reference in their entirety, except to the extent that they conflict with teachings explicitly set forth in this specification.

In this specification and in the claims, which follow, reference will be made to a number of terms which shall be defined to have the following meanings:

"Optional" or "optionally" means that the subsequently described circumstance may or may not occur, so that the description includes instances where the circumstance occurs and instances where it does not. For example, if a device optionally contains a feature for sequentially delivering laser energy to a single location, this means that the delivery feature may or may not be present, and, thus, the description includes structures wherein a device possesses the delivery feature and structures wherein the delivery feature is not present.

Figure 1:
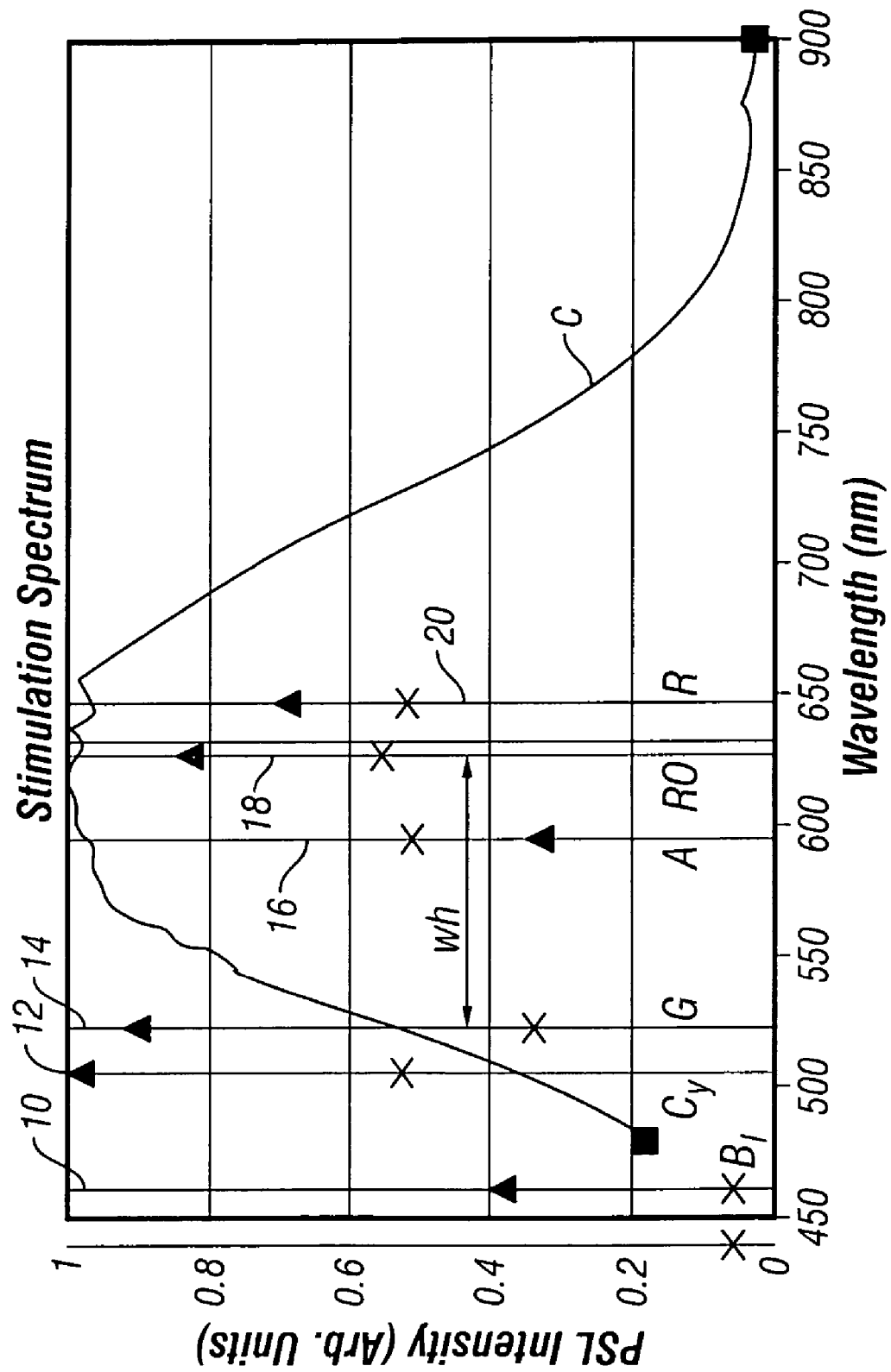
FIG. 1 shows the stimulation spectrum for an image storage screen.

The excitation spectrum associated with storage image screens such as, but not limited to storage phosphor, may be fairly broad. Referring now to FIG. 1, a graph is presented that shows the stimulation spectrum for a particular phosphor image screen from one screen manufacturer. The X-axis on the chart corresponds to stimulation wavelength while the Y-axis shows the intensity of stimulated phosphorescence. The curve C shows the intensity of stimulated phosphorescence when an exposed screen is stimulated at different wavelengths. This broad smooth excitation spectrum or curve probably has one or more excitation lines or specific wavelengths in the broad curve.

Figure 2:
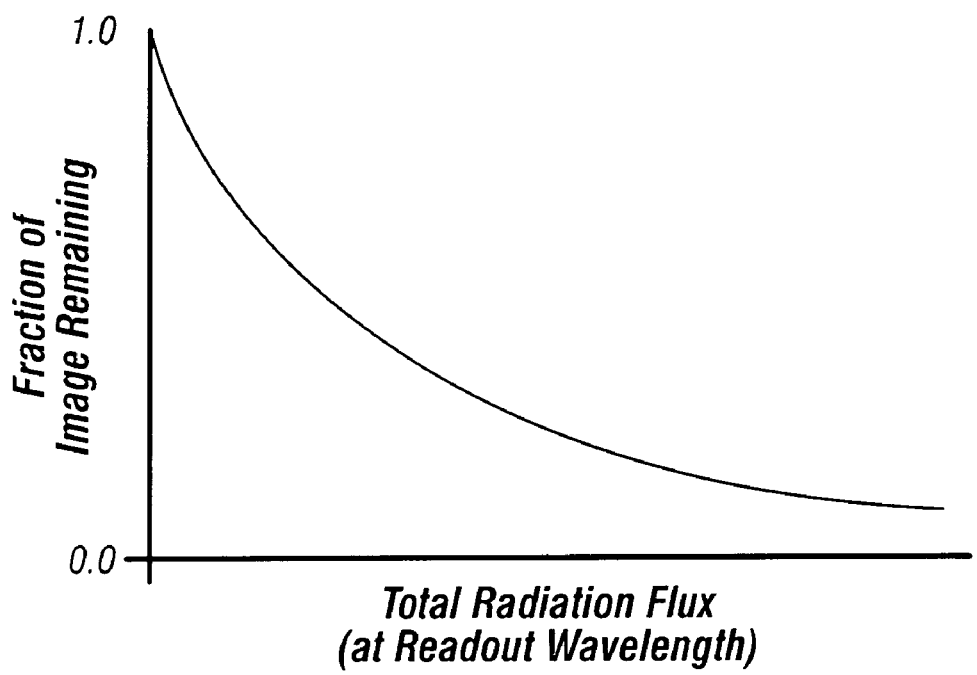
FIG. 2 shows the retention of stored energy in an image as a function of the application intensity of a particular readout wavelength.

In this embodiment, as the screen is exposed to a single (readout) wavelength, the trapped energy stored in the screen is released. Referring now to FIG. 2, a graph is presented which shows the energy remaining in the screen after exposure to increasing amounts of the single wavelength. In this specific instance, the storage screen was AGFA MD10, and the readout wavelength was 640 nm. After an initial drop, it becomes increasingly difficult to extract the remaining energy.

It has been found that exposure of an image plate to energy of one (pumping) wavelength can increase the fraction of the latent image which can be readout by light of a second (readout) wavelength. Accordingly, by using multiple wavelengths of energy in the readout process, the overall readout efficiency can be improved.

Figure 3:
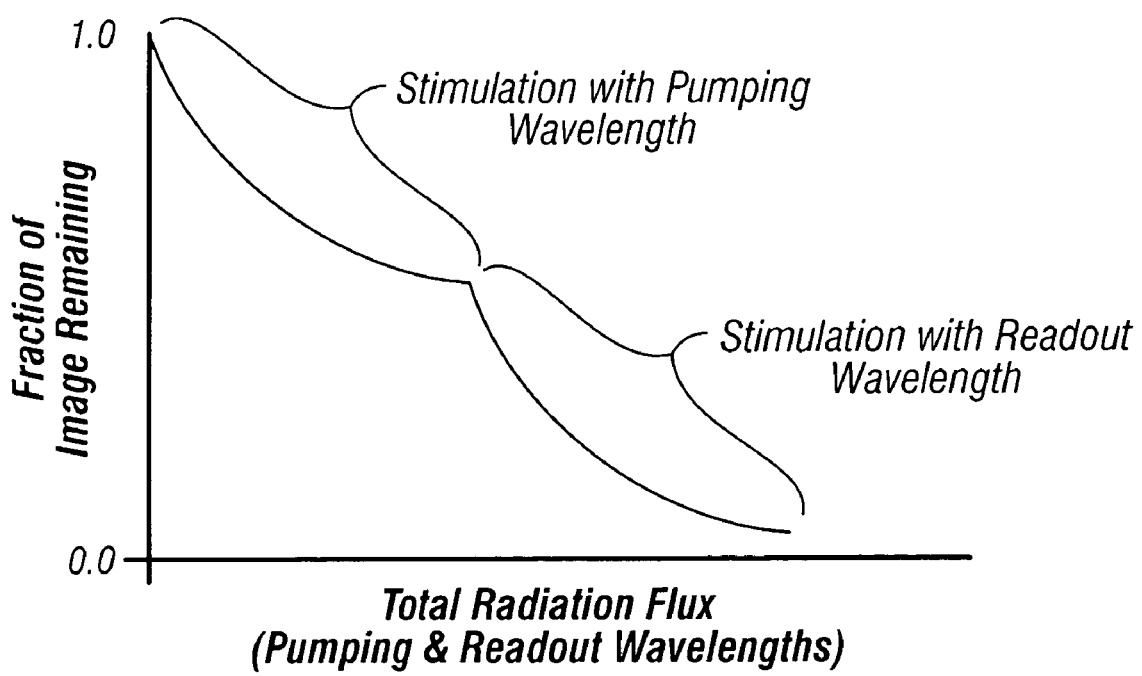
FIG. 3 shows the retention of stored energy in an image as a function of the application intensity of two different wavelengths of light applied consecutively.

Referring now to FIG. 3, the remaining energy is shown in this embodiment after exposure first to stimulation at 460 nm followed by stimulation at 640 nm. The combination of the two wavelengths is more effective in stimulating emission than either wavelength used singly.

In the present application, we refer to the first wavelength as the "pumping" wavelength, as it pumps the trapped states from one energy level to another where they are more readily accessible by the second "readout" wavelength. In some embodiments, however, the pumping wavelength may also stimulate emission of phosphorescent light, thus contributing to the readout of the plate. Likewise, the readout wavelength may, in addition to directly stimulating, pump states to levels where they are more accessible for readout by either wavelength. For clarity, we will refer to the two (or more) wavelengths involved by their principal function with the implicit understanding that their functions are not exclusive. In referring to a wavelength, we are specifically including the case where the light comprises a band of wavelengths, which are grouped about a specific wavelength.

It should be noted that if a pumping wavelength has been applied to a plate, the distribution of energy states has been modified. Thus the response of the screen to a readout wavelength, such as that shown in FIG. 1, will also be changed. As a consequence, the choice of optimal readout wavelength(s) may depend on the wavelength(s) and intensity of the light used for pumping.

In one embodiment of the invention shown in FIG. 4, light or energy of two separate wavelengths is delivered simultaneously and/or sequentially to identical or nearly identical positions or locations on the screen while the stimulated phosphorescence is collected. This particular embodiment of the system may optionally have a first laser source 24 and a second laser source 30 to provide the desired wavelengths. It should be understood that other energy sources may optionally be used in place of laser sources 24 and 30. Dichroic, trichroic, and other mirrors may optionally be used in the optical to direct light towards an image plate P. This configuration of the optical train is purely exemplary and it should be understood that a variety of other configurations may also be used. A processor 50 is provided that may have logic to control the energy exposure from the laser light sources.

Figure 4A:
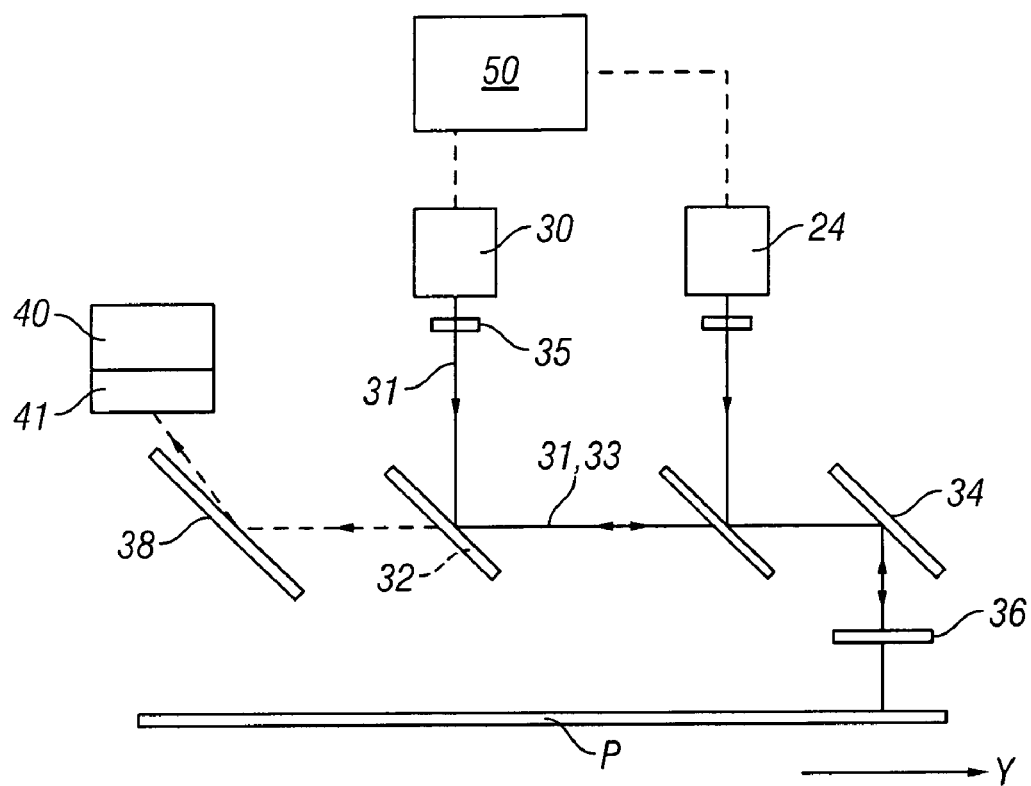
FIG. 4A shows one embodiment of a device according to the present invention.
Figure 4B:
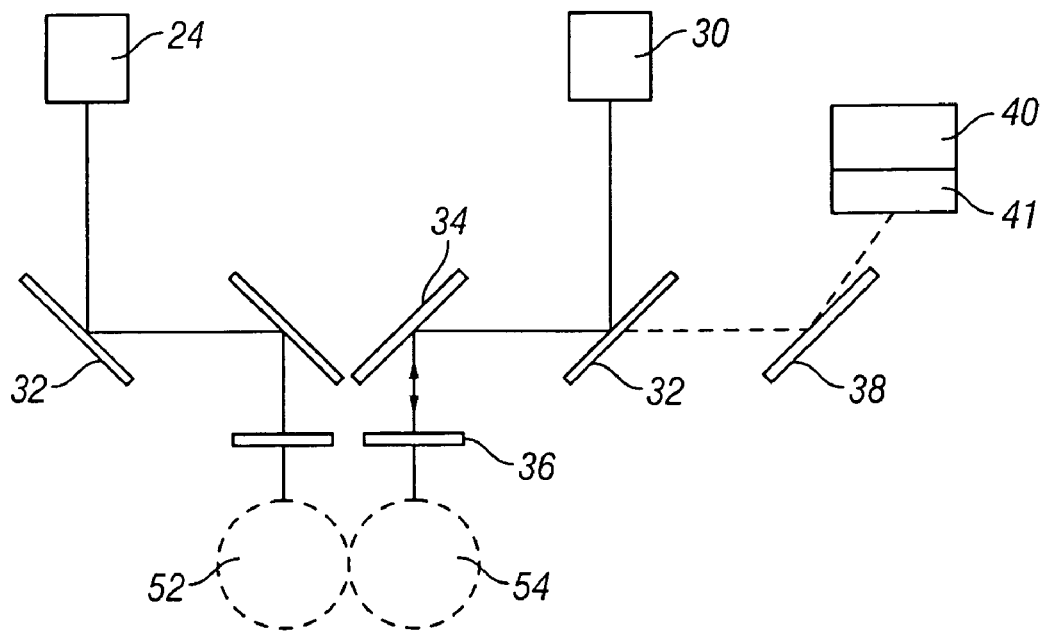
FIG. 4B shows another embodiment of a device according to the present invention where adjacent locations on a screen are exposed first to a pump wavelength and then a readout wavelength.

In another embodiment of the present invention as seen in FIG. 4B, adjacent locations 52 and 54 on the screen are exposed to light at the two different wavelengths. The location 52 is exposed to the pump wavelength from source 24 and as the screen moves (as indicated by arrow 56) location 52 will then move under location 54 where it is exposed to readout radiation from source 30 and data is read.

In another embodiment of the invention, light of two separate wavelengths is delivered in rapid (possibly overlapping) succession to identical or nearly identical positions on the screen while the phosphorescence is collected.

In another embodiment of the invention, light of more than two separate wavelengths (including one or more continua) is delivered simultaneously to identical or nearly identical positions on the screen while the phosphorescence is collected.

In another embodiment of the invention, light of more than two separate wavelengths (including one or more continua) is delivered in rapid (possibly overlapping) succession to identical or nearly identical positions on the screen while the phosphorescence is collected.

In yet another embodiment of the invention, light of two or more separate wavelengths (including one or more continua) is delivered simultaneously to the screen at two or more locations such that the collection of light from the multiple locations is accomplished using independent light-collection means. By way of example and not limitation, one embodiment may have more than one pumping source so that multiple locations are pumped before being readout.

In a still further embodiment of the invention, light of two or more separate wavelengths (including one or more continua) is delivered to the screen at separate times, and the phosphorescence from those stimuli is collected separately.

In another embodiment of the invention, light of two or more separate wavelengths (including one or more continua) is delivered to the screen at separate times, and the phosphorescence from the pumping stimulation is not collected.

All of the above may be provided by a microprocessor that has logic for controlling energy sources to deliver energy in the manner as described.

Suitable Scanning Device

Figure 5A:
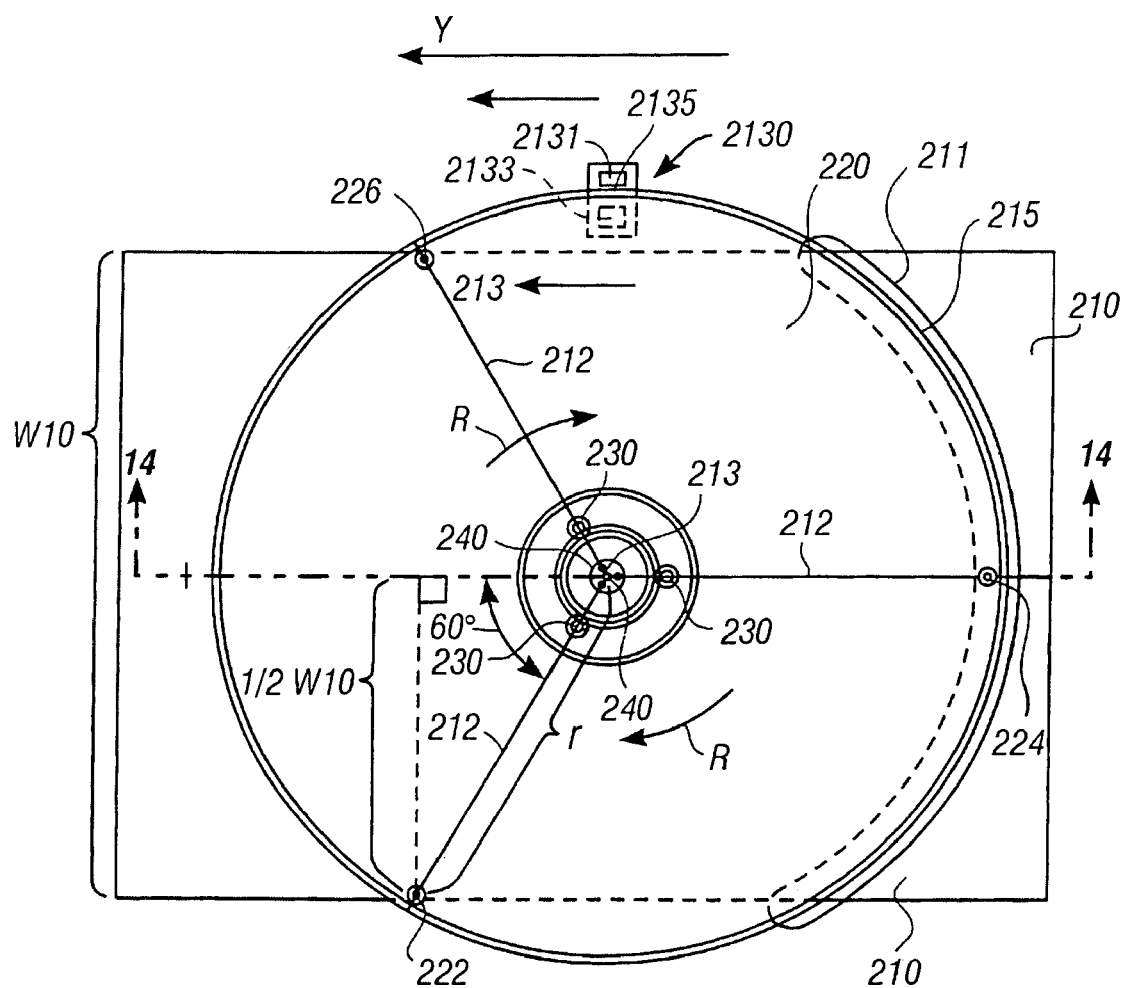
FIG. 5A is a top plan view of a first embodiment of the present invention incorporating three radially extending optical trains mounted at 120.degree. to one another, with the "optical radius" (ie: the radial distance from the center of the scanning device to the focal point of the laser beam under each scanning head) being 1.1547 times one-half the width of the phosphor screen.
Figure 5B:
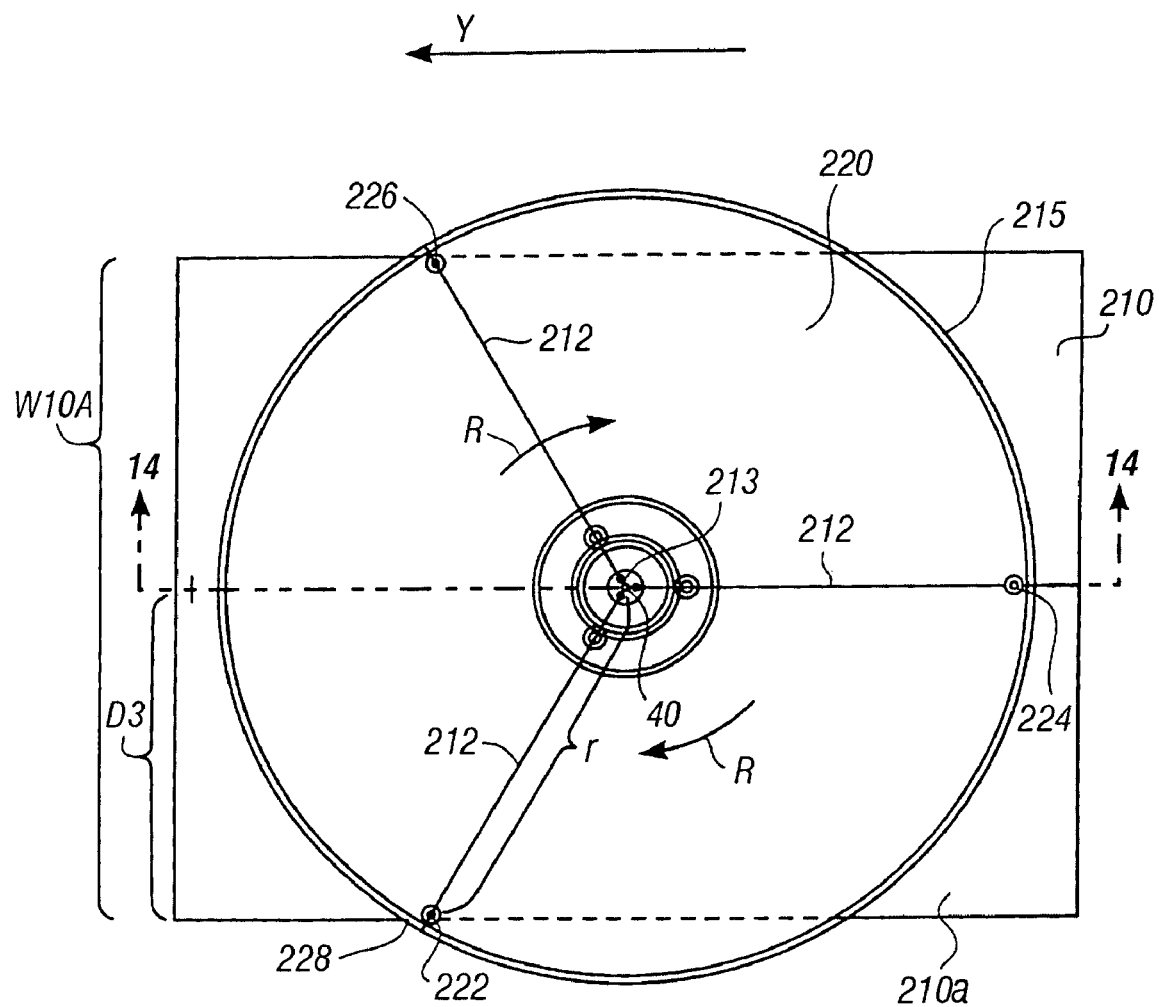
FIG. 5B is a top plan view of a second embodiment of the present invention incorporating three radially extending optical trains mounted at 120.degree. to one another, with the optical radius being slightly greater than 1.1547 times one-half the width of the phosphor screen.
Figure 6:
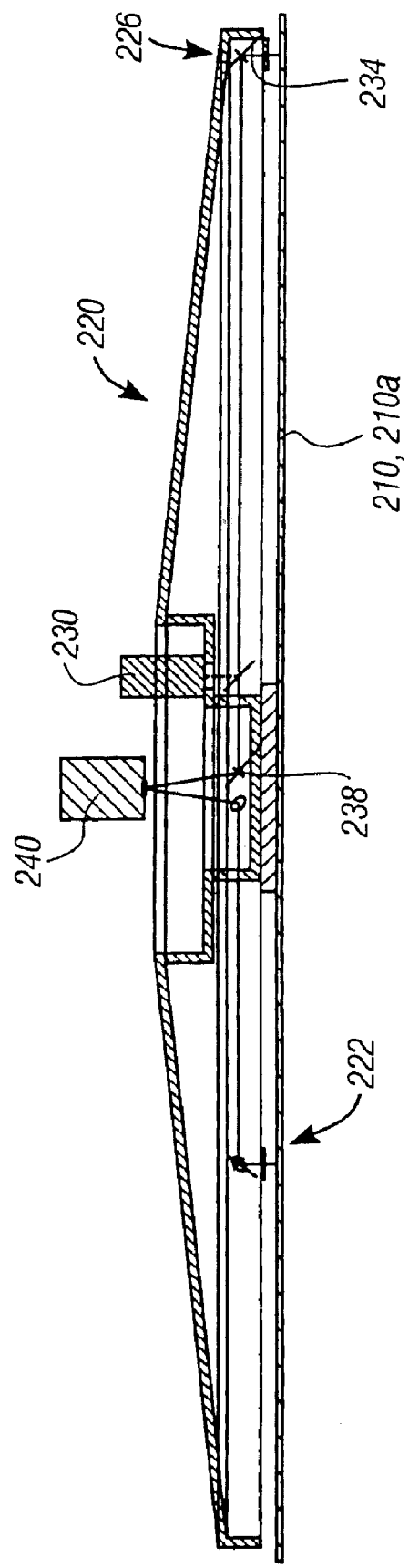
FIG. 6 is a side sectional view taken along the line 2—2 in FIG. 5A.

The present invention may optionally be coupled with a scanning device that provides multiple head high-speed rotary scanning devices for reading an image on a phosphor screen and methods for its use. In a first embodiment of the present invention, FIGS. 5A and 5B show schematic top plan view of aspects of a three-head rotary scanning device 220 according to the present invention as positioned over the surface of phosphor screen 210 and 210a respectively. Rotary scanning device 220 comprises three radially extending optical trains 212 oriented at 120.degree. to one another on its underside. (The positions of optical trains 212 are shown schematically in FIGS. 5A and 5B, and the details of optical trains 212a, 212b and 212c are better seen in FIGS. 7 through 8C). In one manner of operation, scanning device 220 is rotated about its center 213 in direction R as phosphor screen 210 is moved in direction Y. Rotation of scanning device 220 about center 213 can be accomplished by any conventional high speed motor and drive system that produces a constant speed of rotation of scanning device 220. Alternatively, the speed of rotation of the scanning device can be measured and the data acquisition system can be synchronized to compensate for any minor variations in rotation speed. Translation of phosphor screen 210 in direction Y can be accomplished by attaching phosphor screen 210 to a motorized transport mechanism, such as a series of rollers and guides, or to a translation stage.

Each of the three optical trains 212 comprise a single scanning head (either 222, 224, or 226) which is disposed at a location at or near the outer perimeter 215 of scanning device 220, as shown. As will be explained, each individual optical train 212 and its associated scanning head, (being either scanning head 222, 224 or 226), operates to direct a focused beam of incident laser light towards phosphor screen 210 and to receive response radiation emitted by phosphor screen 210. Using any one of a number of optical trains (such as optical trains 212a, 212b, 212c, 212d or 212e as will be described), response radiation received by the scanning head is separated from the incident laser light and is directed towards a centrally-located photomultiplier tube 240 for gathering image data, as will be explained.

In the embodiments shown in FIGS. 8A through 8E, each optical train may comprise its own laser source 230 such that each scanning head 222, 224 and 226 has its own dedicated laser. By activating each of the three lasers in sequence, each of scanning heads 222, 224 and 226 will sequentially direct laser light onto the surface of phosphor screen 210 while collecting response radiation emitted from phosphor screen 210. By activating each scanning head in sequence, such that only one scanning head is active at a time, or by providing mechanical shielding such that the laser beam in each scanning head reaches the phosphor screen one at a time in sequence, imaging data will be collected from only one scanning head at a time, thereby allowing a single photomultiplier tube to be used for data collection from each of the three optical trains, while preventing stray laser light from adding noise to the collected data signal. Although the present invention operates with one central photomultiplier tube or photodiode, as explained, the present invention also encompasses embodiments having a dedicated photomultiplier tube or photodiode used for each optical train.

In the three head design shown in FIGS. 5A to 8C and 9, each scanning head 222, 224 and 226 will sequentially pass over the surface of phosphor screen 210 in an arcuate path. By advancing the phosphor screen relative to the rotating scanning device, a curved raster scan is generated, which can later be converted from polar coordinates into Cartesian coordinates. It should be understood that any of the above embodiments may be modified to so that at least one optical train may include a pump light source as shown in FIG. 4A. In some embodiments, every optical train may include a pump light source. They may all be controlled by a central processor. In yet another embodiment, any of the optical trains in FIGS. 8A-8E may include a pump source sending light to a location adjacent the location being readout as shown in FIG. 4B.

The ratio of optical radius r, (shown in FIG. 5A as the distance from center 213 of scanning device 220 to the focal point of the laser beam under scanning head 222), to one-half the width of the phosphor screen may be selected such that the focused laser beam under each scanning head (22, 224 or 226) passes completely across the entire width of phosphor screen 210 one after another, before a subsequent scanning head passes over the phosphor screen. In another aspect, scanning heads 222, 224 and 226 are operated in sequence, such that only one scanning head is actively scanning across the phosphor screen at a time. For example, the laser in scanning head 222's optical train is turned on during the interval of time during which scanning head 222 moves across the phosphor screen from its position as shown in FIG. 7A to the position presently occupied by scanning head 226 in FIG. 7A. During the interval of time in which scanning head 222 moves across the surface of screen 210, the laser in each of scanning head 224 and 226's optical train will turned off. After scanning head 222 reaches the position presently occupied by scanning head 226, scanning head 222's laser will be turned off and scanning head 224's laser will be turned on.

Alternatively, the lasers in all three optical trains can be continuously operating, with mechanical shielding 211 (positioned between phosphor screen 210 and scanner 220 as shown in FIG. 5A), ensuring that the laser beam in each scanning head reaches the phosphor screen one at a time in sequence. Specifically, mechanical shielding can be provided such that the laser beam from any scanning head only reaches screen 210 when the scanning head is passing between the positions occupied by scanning heads 222 and 226 in FIG. 5A. Accordingly, as scanning head 222 moves across screen 210 (to the position presently occupied by scanning head 226), the laser beams emitted from scanning heads 224 and 226 will be blocked from reaching screen 210.

Each of the various scanning heads 222, 224 and 226 may have the same optical radius. Specifically, the optical radius r between center 213 to the focal point of the laser beam under scanning head 222 will equal the optical radius between center 213 and the focal points of laser beams under scanning heads 224 and 226.

Optionally, the ratio of the optical radius relative to the phosphor screen width can also be selected such that a very short time gap occurs between the data collection of each subsequent scanning head. Such a short time gap facilitates image data processing as it makes it easier to distinguish between data collected by each of the various scanning heads 222, 224 or 226 and provides time for initialization of the data acquisition system.

As is shown in FIGS. 5A and 5B, scanning device 220 may optionally comprise a disc, however, the rotatable frame of the scanning device may instead comprise a Y-shaped frame 2120 having three radially extending arms connected together at the center of the frame.

Figure 8A:
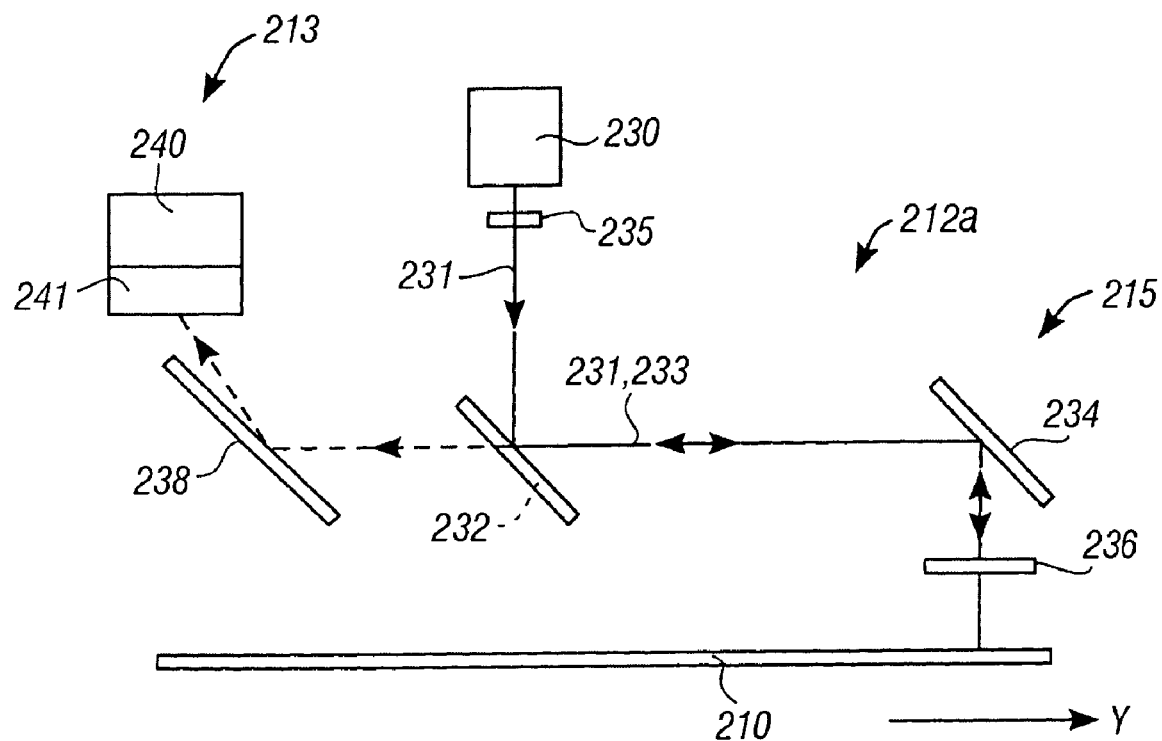
FIG. 8A is a schematic representation of the optical train shown in FIG. 6.
Figure 8B:
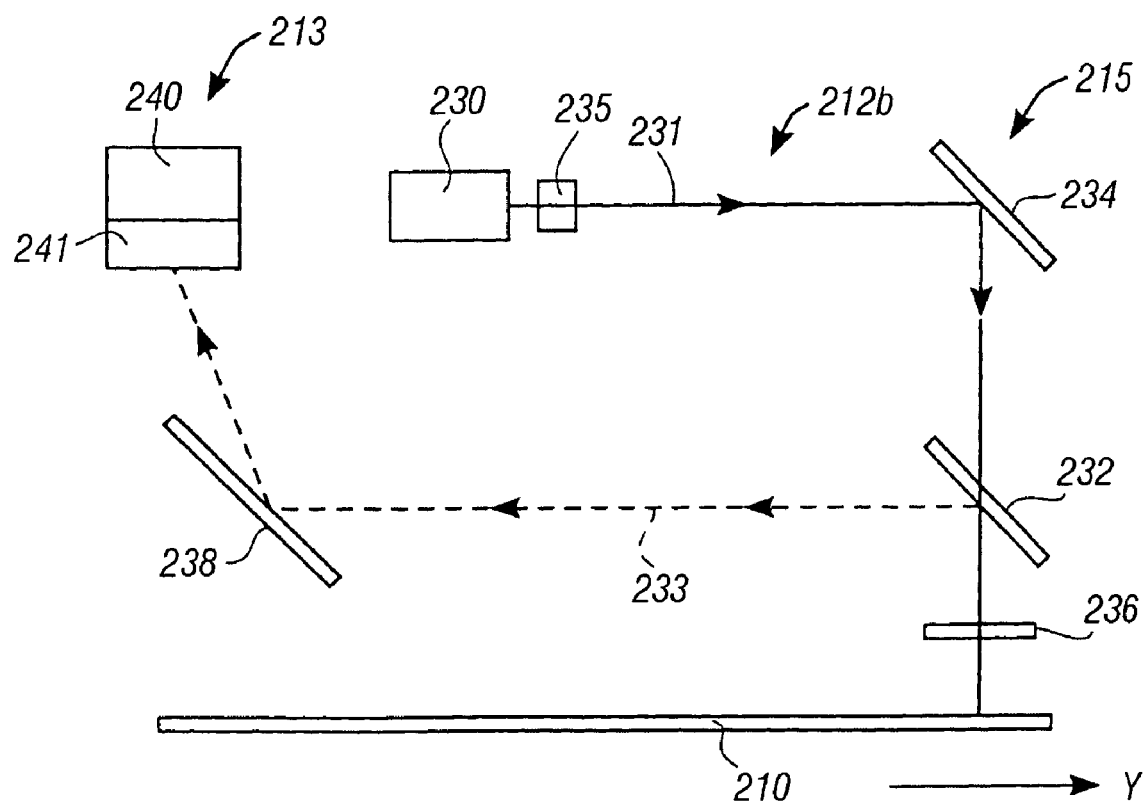
FIG. 8B is a schematic representation of an alternative optical train.
Figure 8C:
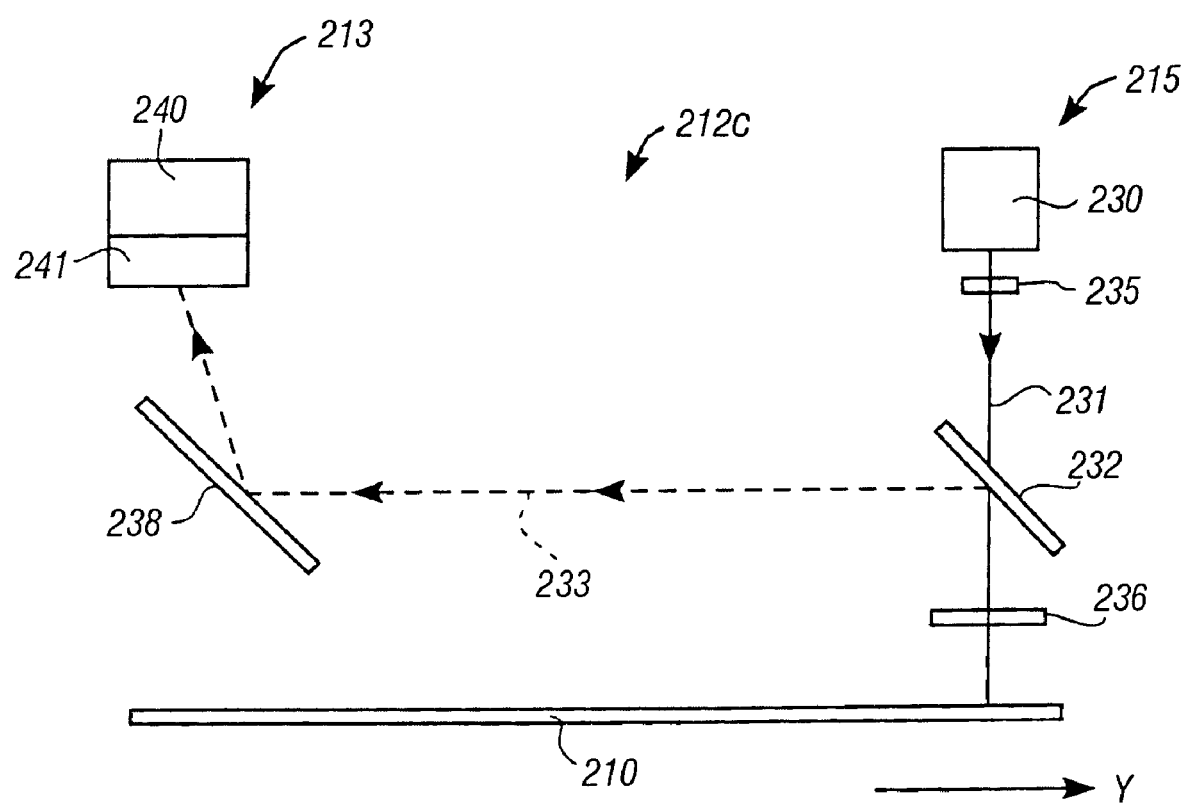
FIG. 8C is a schematic representation of yet another optical train.
Figure 8D:
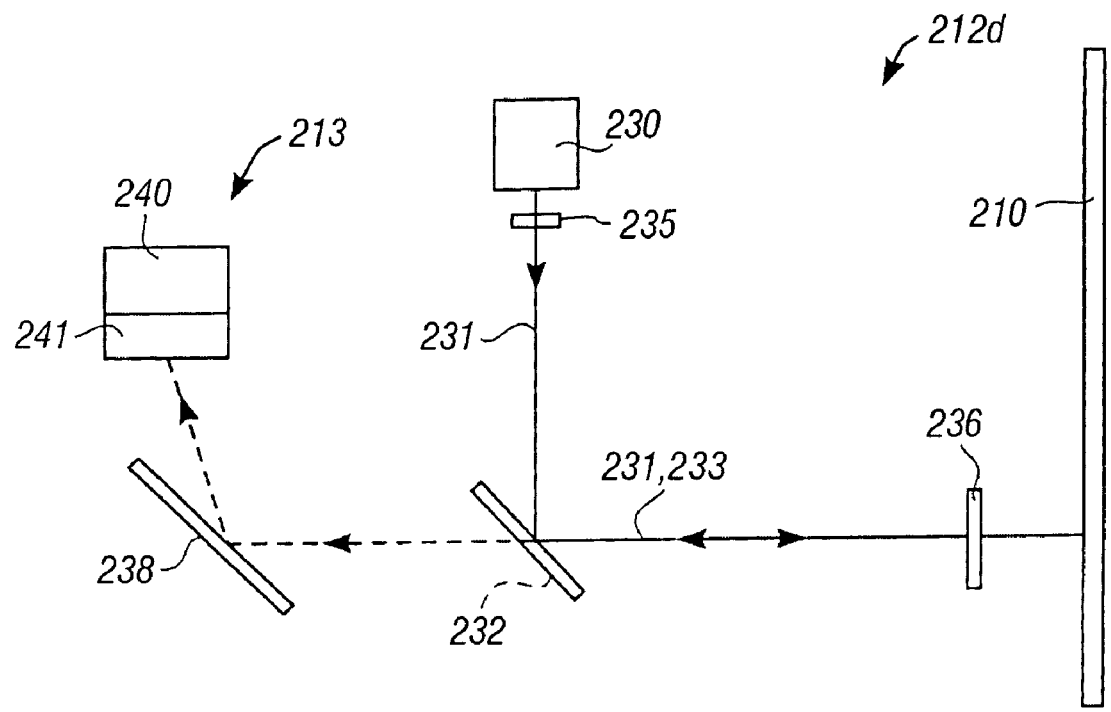
FIG. 8D is a schematic representation of an alternative optical train.
Figure 8E:
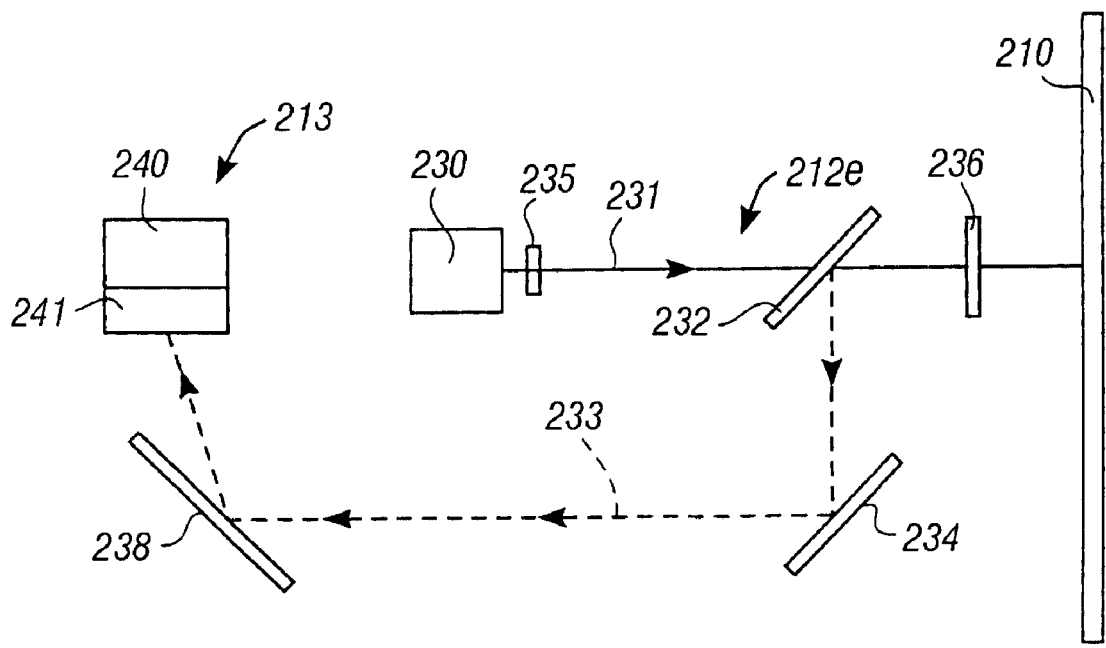
FIG. 8E is a schematic representation of yet another optical train.
Figure 13:
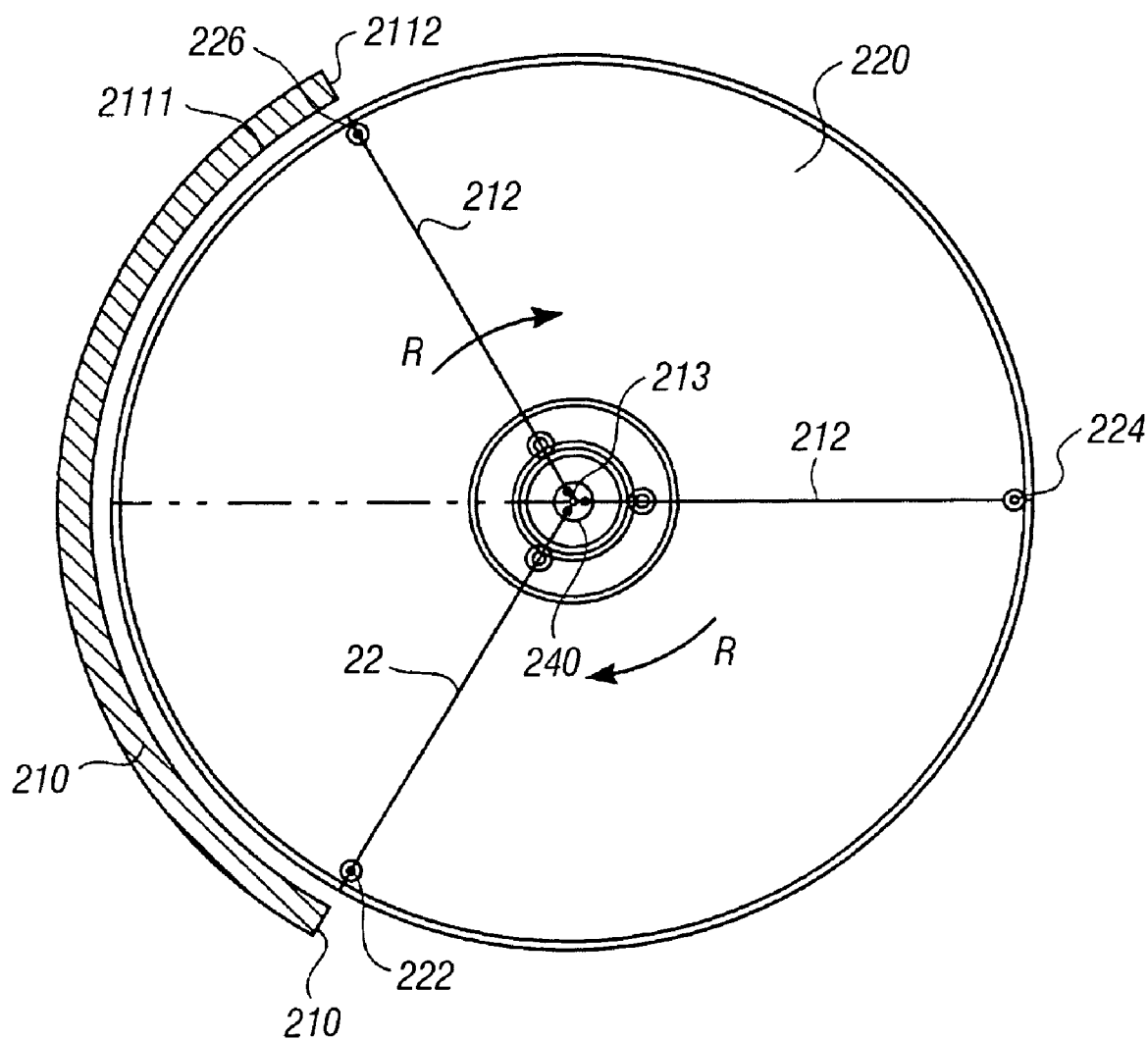
FIG. 13 is a top plan view of an alternate arrangement of the present invention with the phosphor screen disposed perpendicular to the scanning device and partially wrapped around the perimeter of the scanning device.
Figure 14:
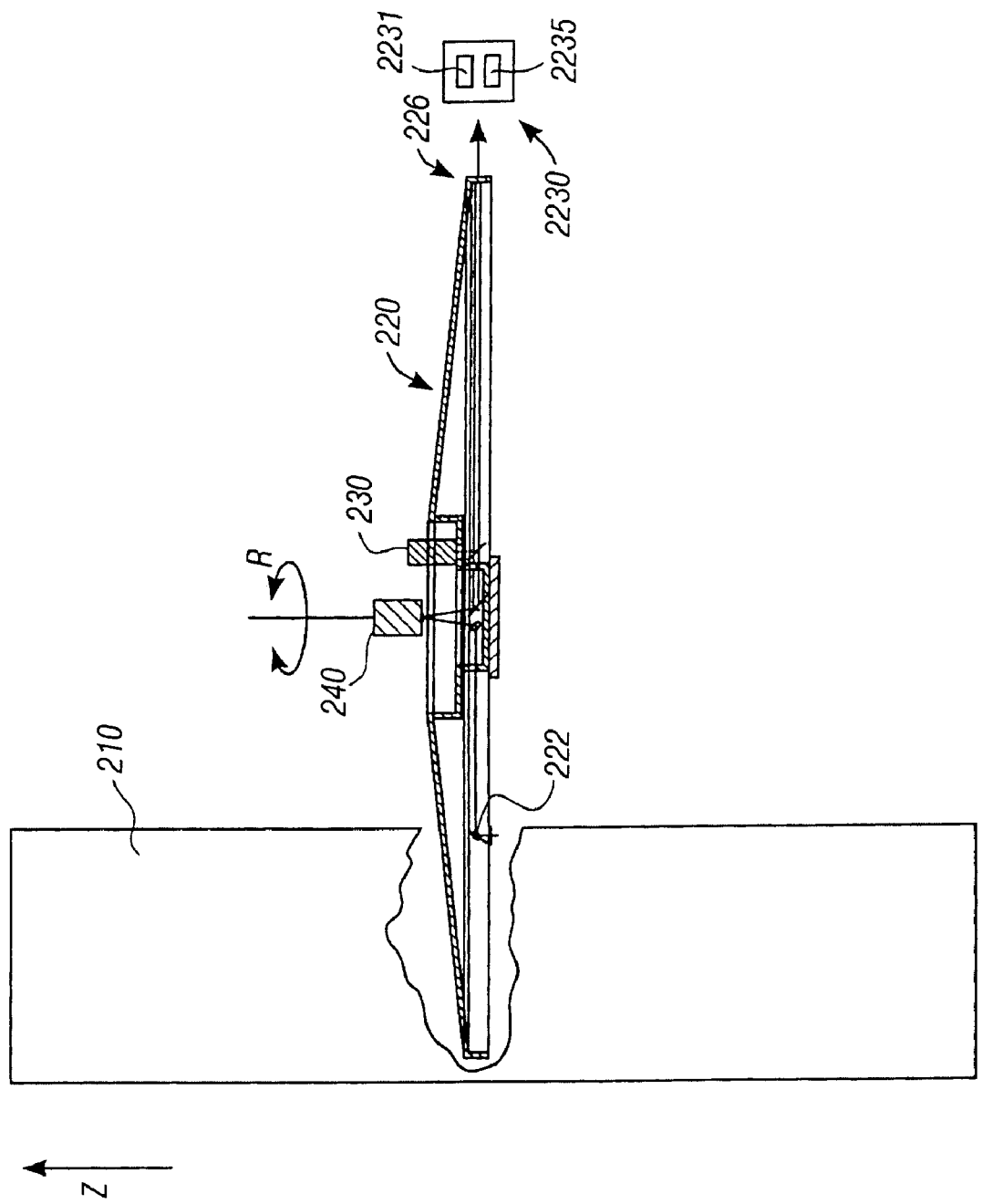
FIG. 14 is a cut away side view corresponding to FIG. 9.
Figure 15:
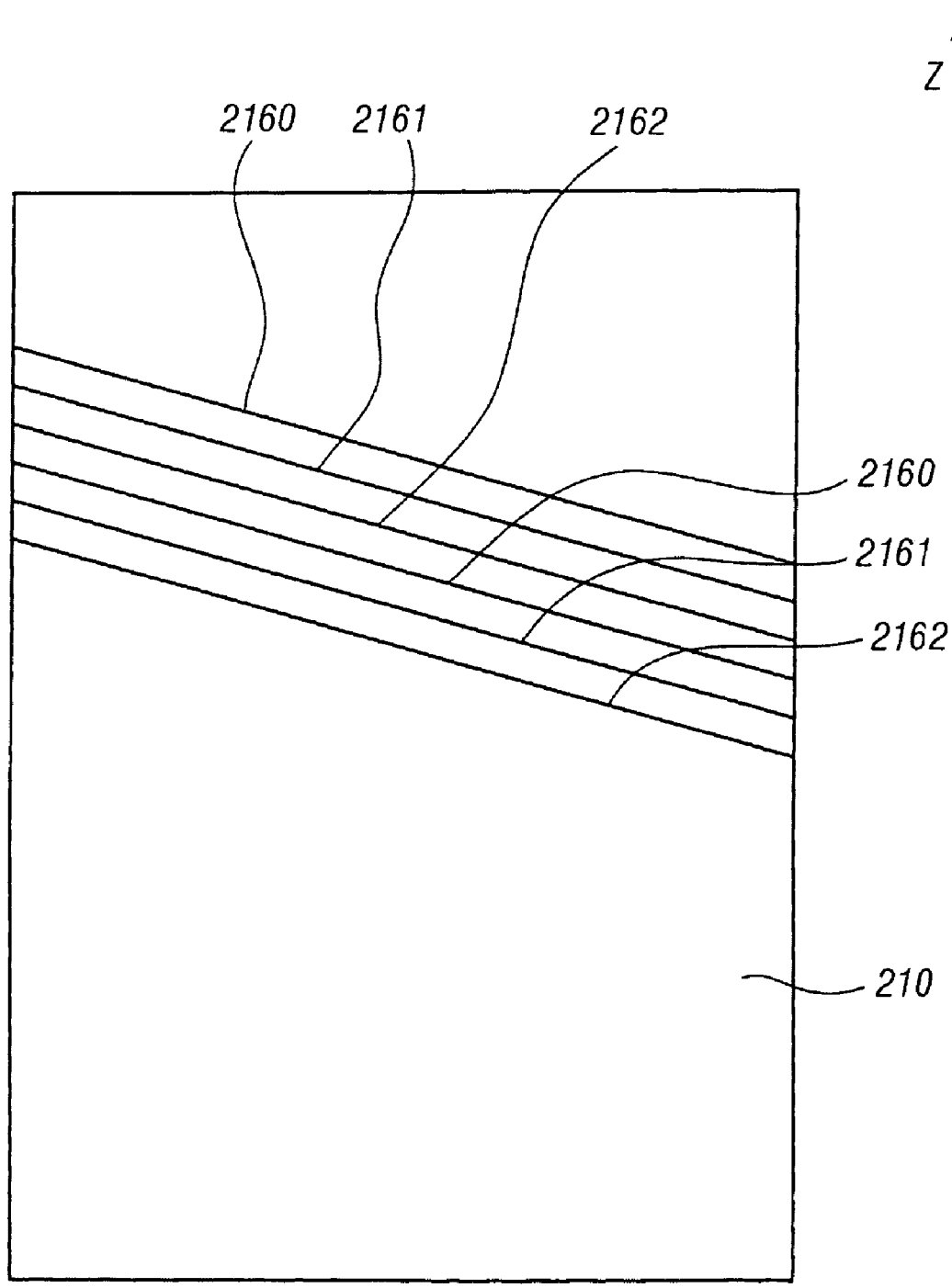
FIG. 15 is an illustration of successive scans taken across the phosphor screen of FIG. 13.

In a second embodiment, the present invention encompasses a rotating scanning head positioned with a phosphor screen wrapped partially therearound as is shown in FIGS. 13 to 15, employing the optical trains as shown in FIGS. 8D and 8E. As is seen in FIGS. 13 and 14, phosphor screen 210 is oriented perpendicular to scanning device 220, with phosphor screen 210 wrapped partially around scanning device 220. As seen in FIG. 14, scanning device 220 rotates in direction R with screen 210 advanced in direction Z, being perpendicular to the plane of rotation of scanning device 220. It is to be understood that such relative motion can alternatively be achieved by holding curved phosphor screen 220 at a fixed position and moving scanning device 220 in the Z direction, rotating scanning device 220 at a fixed Z location and moving phosphor screen 220 in the Z direction, or some combination thereof.

As can be seen in FIG. 13, when using a three head scanner, phosphor screen 210 may be wrapped to extend 2120 degrees around scanning device 220, such that it spans the arcuate distance between successive scanning heads 222 and 226 as shown. Similarly, when instead using a two head scanner having optical trains spaced 180.degree. apart, phosphor screen 210 may be wrapped to extend 180.degree. around scanning device; and similarly, when using a four head scanner, phosphor screen 210 may be wrapped to extend 90.degree. around scanning device to ensure that only one scanning head is passing over the surface of the phosphor screen at a time.

Using this arrangement, (as illustrated for a three head scanner in FIG. 13, scanning head 226 will just complete its scan across phosphor screen 210 as scanning head 222 moves into position to scan across phosphor screen 210. An advantage of this embodiment can be seen in FIG. 15 which shows successive scan lines 2160, 2161 and 2162 taken across screen 210 by sequential scanning heads 222, 224 and 226 respectively. As can be seen, scan lines 2160, 2161 and 2162 taken across phosphor screen 210 are quite straight, being deflected by the amount of movement in the Z direction between successive scanning heads 222, 224 and 226 moving across the phosphor screen. (The actual separation distance between successive scan lines 2160, 2161 and 2162 has been exaggerated for illustration purposes).

As can be seen in FIG. 13, should scanning device 220 be dimensioned such that screen 210 does not span all of the distance between successive scan heads, (for example, should screen 210 reach only between points 2110 and 2111), a gap time will be created between successive scans during the interval of time in which no scanning head is passing over the phosphor screen, (in particular, during the interval of time a scanning head is passing from points 2111 to 2112).

Other Optical Trains

Figure 7:
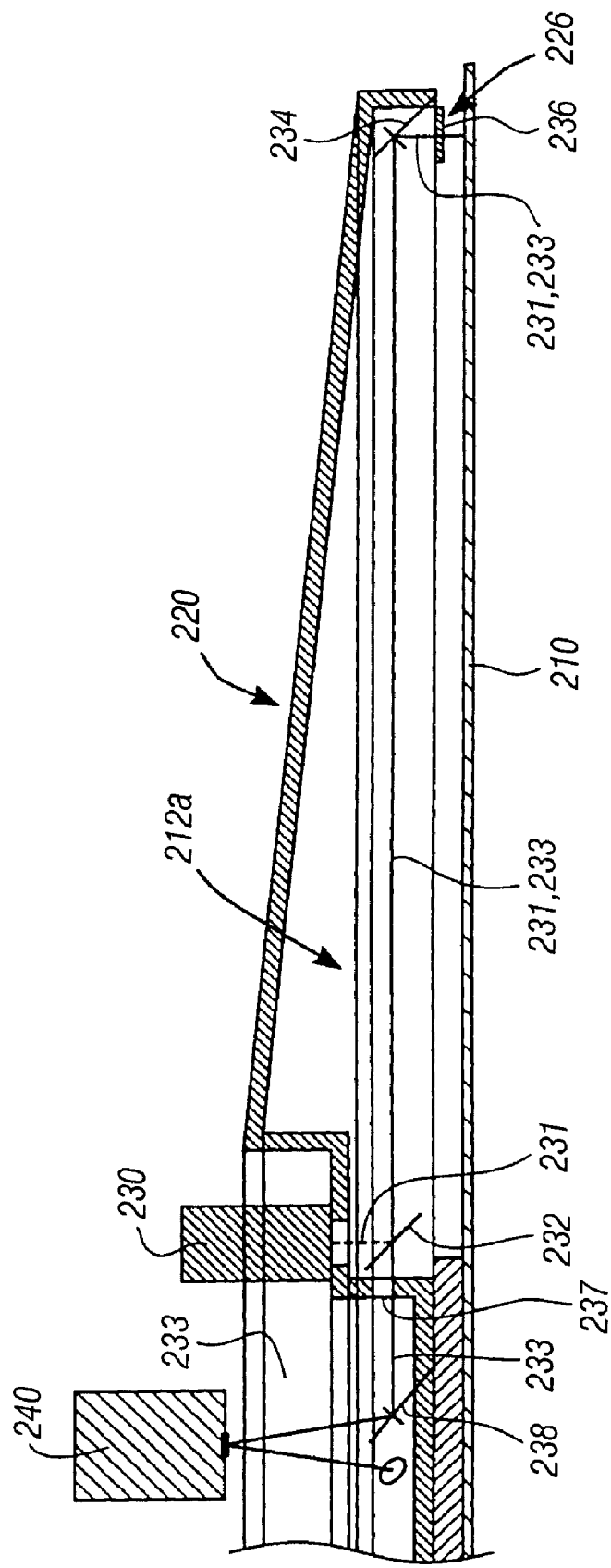
FIG. 7 is an enlarged view of a portion of FIG. 6.

The optical trains shown in FIGS. 7 to 8C are used with the embodiment of the present invention shown in FIGS. 5A to 6 and 9 and the optical trains shown in FIGS. 8D and 8E may be with the embodiment of the present invention shown in FIGS. 13 to 15, as will be explained. Again, these optical trains may be modified to include a second pump source through the use of dichroic mirrors and the like as shown in FIG. 4A.

Referring to the first embodiment, FIG. 7 shows a sectional schematic view of a first optical train comprising a laser 230, dichroic mirror 232, reflecting mirror 234, focusing/collimating lens 236, steering mirror 238, and photomultiplier tube 240. In accordance with this embodiment of the invention, laser 230 emits a collimated beam 231 of laser light which is reflected by dichroic mirror 232 towards reflecting mirror 234 and is further reflected downwardly through lens 236 which focuses beam 231 on phosphor screen 210. A response radiation 233 emitted by phosphor screen 210 will travel upwardly through lens 236 which collimates beam 233 and is then reflected by reflecting mirror 234 along with the same optical path as beam 231. When beam 233 reaches dichroic mirror 232, it will pass therethrough eventually reaching steering mirror 238 which reflects beam 233 into photomultiplier tube 240. Optionally, a second focusing lens 237 can be positioned between dichroic mirror 232 and steering mirror 238. The output of photomultiplier tube 240 over time will correspond to the emitted intensity of emissions along an arcuate scan line across phosphor screen 210. For comparison, FIG. 8A illustrates a schematic of the optical train 212a layout as seen in FIG. 7.

Scanning head 226 comprises those components located at the radially outward end of the optical train. In this embodiment, scanning head 226 comprises reflecting mirror 234 and focusing lens 236. An advantage of this embodiment is that laser 230 and dichroic mirror 232 can be mounted at an inward location proximal the center of the scanning device. Accordingly, a minimal number of system components are disposed at scanning head 226, and thus, the torque required for rotating scanning device 220 at high-speeds is reduced.

Alternative designs for the optical train are possible. For example, FIG. 8B shows optical train 212b comprising laser 230 emitting beam 231 radially outward to reflecting mirror 234 which reflects beam 231 through dichroic mirror 232 and focusing lens 236 towards phosphor screen 210. Response radiation emitted by phosphor screen 210 as beam 233 will be reflected by dichroic mirror 232 radially inwardly to steering mirror 238 which in turn reflects beam 233 to photomultiplier tube 240. In this embodiment, scanning head 226 comprises reflecting mirror 234, dichroic mirror 232 and focusing lens 236.

In another aspect, optical train 212c, (shown in FIG. 8C), comprises laser 230 which emits beam 231 directly downwardly onto phosphor screen 210. Beam 233 will be reflected by dichroic mirror 232 towards steering mirror 238 which in turn reflects beam 233 into photomultiplier tube 240. In this embodiment, scanning head 226 comprises laser 230, dichroic mirror 232 and focusing lens 236. An advantage of this embodiment of the optical train is that a reflecting mirror, (such as mirror 234), is not required.

Optionally, in any of the above aspects of the optical train, a filter 241, which may optionally comprise a red light blocking filter, may be included, and may be positioned between steering mirror 238 and photomultiplier tube 240, as shown in FIGS. 8A to 8E. Filter 241 may permit blue wavelength emitted response radiation beam 233 to pass therethrough, yet prohibit the passage of reflected or scattered red wavelength incident laser therethrough. Optionally as well, a collimating lens 235 can be positioned adjacent laser 230 for producing a collimated laser beam, as shown in FIGS. 8A to 8E.

An important advantage common to all the above described optical trains 212a, 212b, 212c, 212d and 212e is the absence of moving parts since the relative movement of each of the scanning heads 222, 224 and 226 over phosphor screen 210 is accomplished by rotating scanning device 220 about center 213 and moving phosphor screen 210, (or moving scanning device 220), in direction Y by a transport mechanism. Accordingly, the present invention avoids problems of accurately controlling the position of a scanning head which is constantly changing speed while moving back and forth in one or more directions.

In the alternative embodiment shown in FIGS. 13 to 15, optical trains 212d or 212e (FIGS. 8D and 8E) are used. In both optical trains 212d and 212e, the laser beam 231 is directed radially outwardly through focusing lens 236 to phosphor screen 210. In contrast, in optical trains 212a to 212b, (FIGS. 8A to 8B), a reflecting mirror 234, is used to reflect the laser beam 231 downwardly 290.degree. toward phosphor screen 210.

By way of example and not limitation, using any of the various above described embodiments of the optical train, the laser light beam 231 emitted from laser 230 may have a wavelength of about 635 to 680 nM and a power in the range of 0 to 30 mW. Response radiation beam 233 will typically have a wavelength centered at about 390 nM. Collimating/collimating lens 236 may comprise a 25 to 215 mm diameter lens with a focal length of 4 to 10 mm which will focus the collimated beam 231 of laser light into a beam width of about 25 to 250 microns, and more preferably 30 to 80 microns on the surface of phosphor screen 210. Minimizing the diameter of the incident laser light beam upon the phosphor screen will minimize destructive pre-reading of the image data caused by forward overlap of the focused beam and reflected and scattered laser light. It is to be understood that the foregoing wavelengths, powers and sizes are merely exemplary and that other wavelengths, powers and sizes may also be used.

The Use of Different Numbers of Equally Spaced Apart Scanning Heads

The present invention encompasses designs with two, three, four or more scanning heads. The advantages of each of these various designs will be described below.

Using a laser beam excitation system to read an image trapped in a phosphor screen is a "one-time" operation since the actual reading of the stored image by the laser beam will operate to release the image. It is therefore not possible to scan the same pixel of the phosphor screen again and again.

Figure 9:
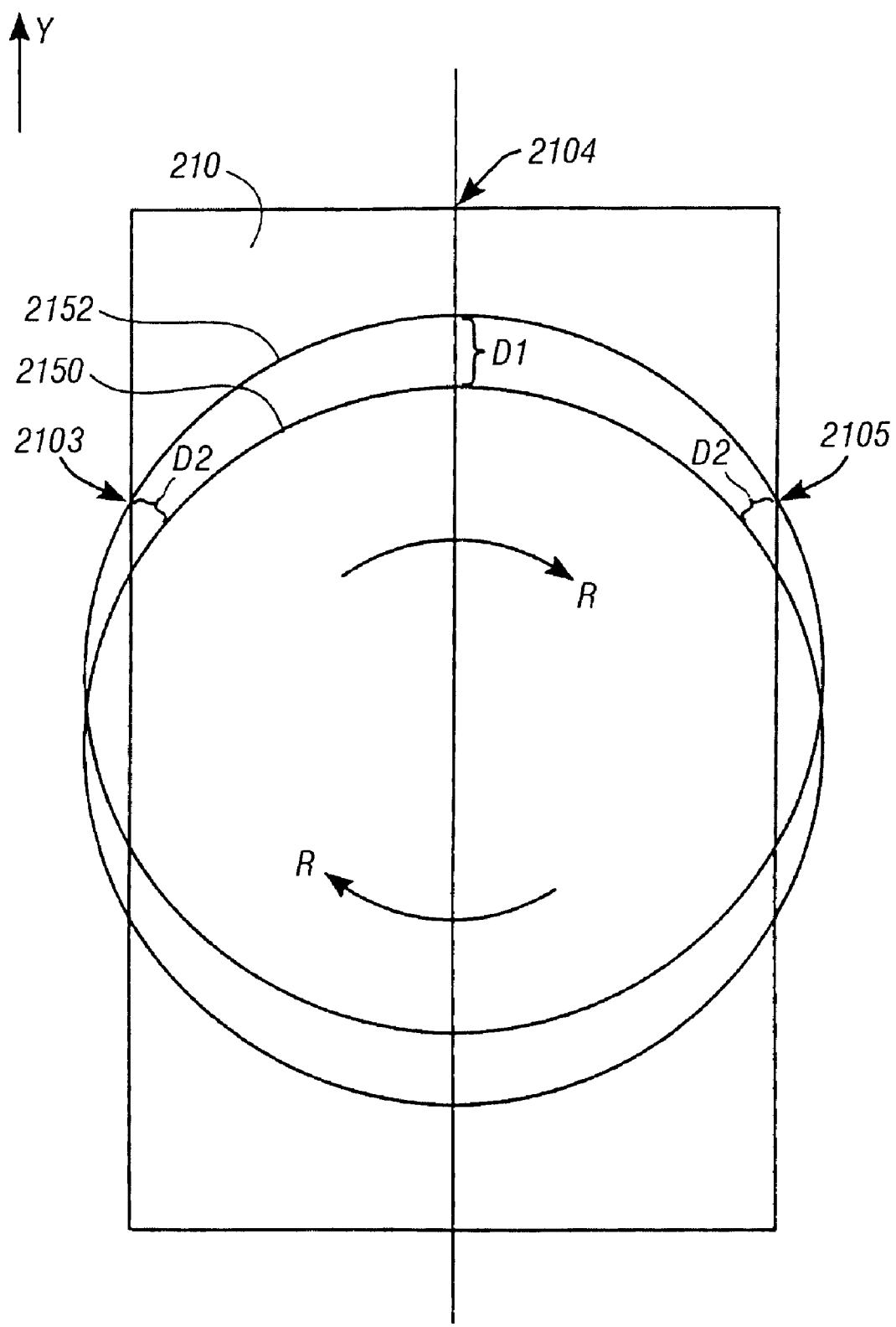
FIG. 9 is a geometric representation of incremental movement of an arcuate line across the surface of a phosphor screen.

FIG. 9 is an geometric representation of successive scan lines taken by the rotating scanning device 220 of FIG. 5A (not shown) above phosphor screen 210 as screen 210 is incrementally moved in the Y direction. (The actual separation distances between scan lines 2150 and 2152 are exaggerated in FIG. 9 for illustration purposes.) As the scanning device is rotated, a first arcuate scan line 2150 will be taken by a first scanning head passing across the surface of phosphor screen 210 from edge 2103 to edge 2105. Coincident to the first scanning head reaching edge 2105, phosphor screen 210 will have advanced in direction Y by distance D1. Accordingly, a second scan line 2152 will then be taken across phosphor screen 210 by a second scanning head passing from edge 2103 to 2105.

It should be understood that any of these embodiments may be modified to so that at least one optical train may include a pump light source as shown in FIG. 4A. In some embodiments, every optical train may include a pump light source. They may all be controlled by a central processor. In yet another embodiment, any of the optical trains may include a pump source sending light to a location adjacent the location being readout as shown in FIG. 4B.

As can be seen, distance Dr. is the distance separating scan lines 2150 and 2152 at center location 2104. Distance D2 is the distance separating scan lines 2150 and 2152 at edge 2105, (and also edge 2103), as shown. (In particular, distance D2 is measured as the perpendicular distance between lines tangential to scan lines 2150 and 2152 at edges 2105 and 2103.) As can be seen, distance D2 is smaller than distance Dr. since the separation spacing between lines 2150 and 2152 will progressively narrow towards the edges of the phosphor screen.

To avoid destructive reading caused by scanning the same pixel in the phosphor screen more than once, it is therefore important that the separation distance D2 between successive scan lines 2150 and 2152 does not become too small, and in particular does not become much smaller than the focused laser beam spot diameter. Should the separation distance D2 become somewhat smaller than the focused laser beam spot diameter, successive scanning heads will tend to pass over the same pixels at the edges of the phosphor screen, resulting in destructive reading. Accordingly, it is therefore desirable to maintain a sufficient distance D2, which will be defined in part by the diameter of the focused laser beam. As can be appreciated, the straightness of scan lines 2150 and 2152 is determined by the ratio of the scanning device optical diameter to phosphor screen width, with straighter scan lines occurring as the ratio of the scanning device optical diameter to phosphor screen width is increased. The larger the spacing of D2 becomes at the edges of the phosphor screen, the less potential for destructive reading at the edges of the phosphor screen.

Figure 10A:
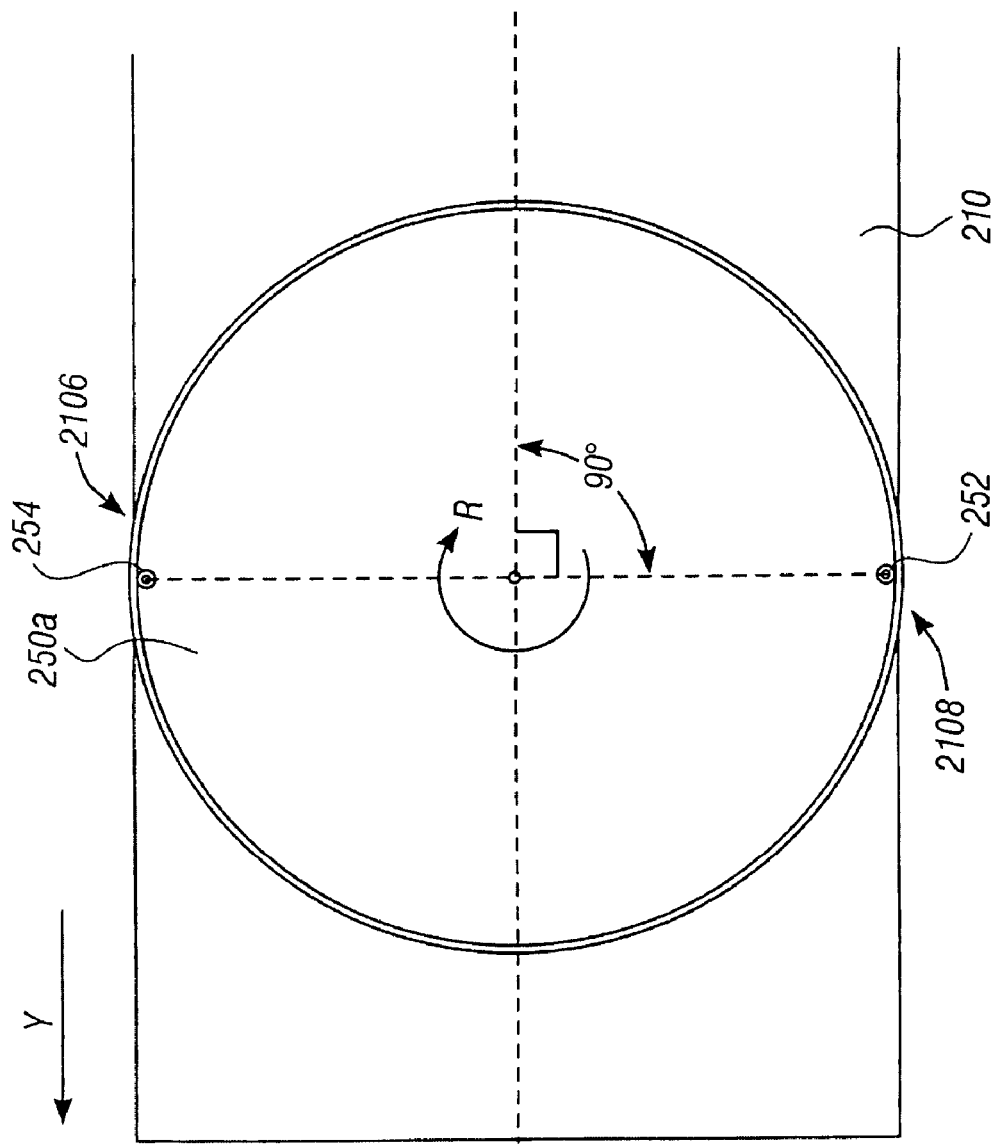
FIGS. 10A and 10B show a two head scanning device.

FIG. 10A shows a two head scanning device 250*a* having scanning heads 252 and 254. Scanning device 250*a* is dimensioned such that the separation distance between scanning heads 252 and 254 is equal to the width of phosphor screen 210. As scanning device 250*a* is rotated in direction R, each of scanning heads 252 and 254 will sequentially trace an arcuate semi-circular path across the surface of phosphor screen 210 from edge 2108 to edge 2106. Scanning heads 252 and 254 are always positioned over the phosphor screen, however, scanning heads 252 and 254 are activated one at a time such that after scanning head 252 has scanned across the phosphor screen from side 2108 to 2106, (and is then turned off), scanning head 254 will have moved into the position currently occupied by scanning head 252 such that scanning head 254 can be turned on to similarly scan across the phosphor screen from edge 2108 to 2106.

A major limitation of the system of FIG. 10A is the fact that the reading of the image stored in screen 210 will result in destructive reading of image data proximal the edges of the screen 210 since scanning heads 252 and 254 will tend to pass over the same pixels one after another at screen edges 2106 and 2108. Specifically, should an attempt be made to acquire a pixel by pixel scan of the phosphor screen using the system as dimensioned in FIG. 10A, it is difficult to generate meaningful data toward screen edges 2106 and 2108, due to the fact that data sampling will essentially comprise oversampling the same pixels with each scan, thereby attempting to re-read pixels from which the stored image has already been released.

As was stated, it would be desirable to have the sequential scan lines passing across the surface of the phosphor screen being as straight as possible, such that adequate separation is maintained between these scan lines at the edges of the screen, (such that individual pixels are not sampled more than once).

Figure 10B:
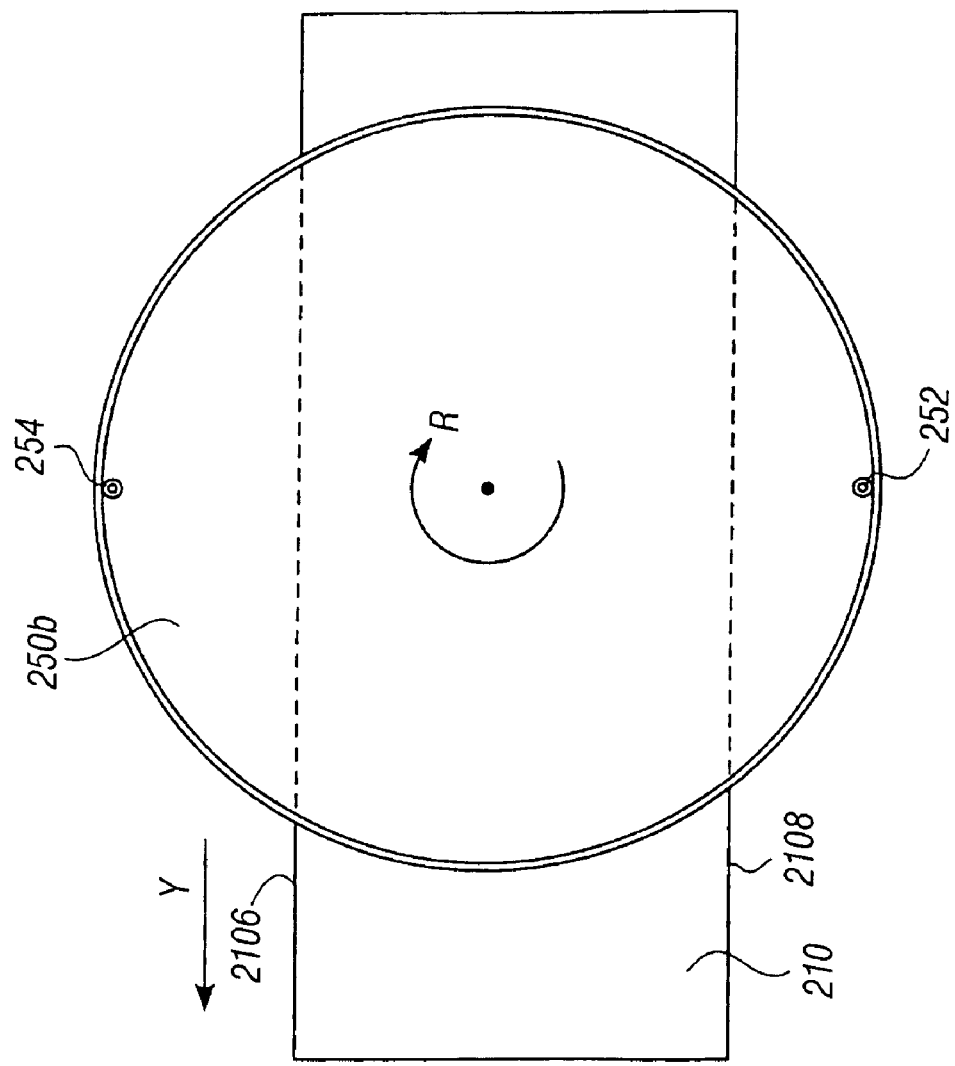

In the embodiment of the present invention shown in FIG. 10B, the two head scanning device is instead dimensioned with a larger diameter to screen width ratio than as illustrated in FIG. 10A. As such, straighter scan lines, (having greater separation distance therebetween at the edges 2108 and 2106 of phosphor screen 210), will be generated. However, time gaps will occur between the data sampled by the scanning heads, due to the fact that both scanning heads 252 and 254 will be positioned off the surface of the phosphor screen for some time during each revolution of the scanning device. This problem can be addressed by increasing the rotational speed of the scanner, such that screen 210 can still be scanned in a relatively short period of time. An advantage of the two head scanning system is that only two optical trains need to be built, making the device easier to manufacture and reducing the weight of the system.

In an alternate embodiment of the invention as shown in FIG. 5A, a three head scanning device is used. The selection of three heads spaced 2120 degrees apart coupled to a single central photodetector as shown has a number of advantages. As will be explained, when the optical radius at 1.1547 times one-half the width W10 of screen 210, 100% read efficiency can be achieved with successive scanning heads moving across the screen one after another with no duty cycle time lost between successive scanning heads. In particular, a first scanning head will just complete its scan across the screen (and begin to move off the surface of the screen), at the same time that a second scanning head will just commence its scan across the screen (and begin to move onto the surface of the screen). Further advantages of the three head scanning system is that it has a minimal number of separate optical trains, a reasonably small scanning device diameter, at the same time providing sufficiently straight scan path across the surface of the phosphor screen such that sequential scan lines are sufficiently separated at the edges of the phosphor screen such that the diameter of the focused laser beam does not result in destructive pre-reading.

Figure 11:
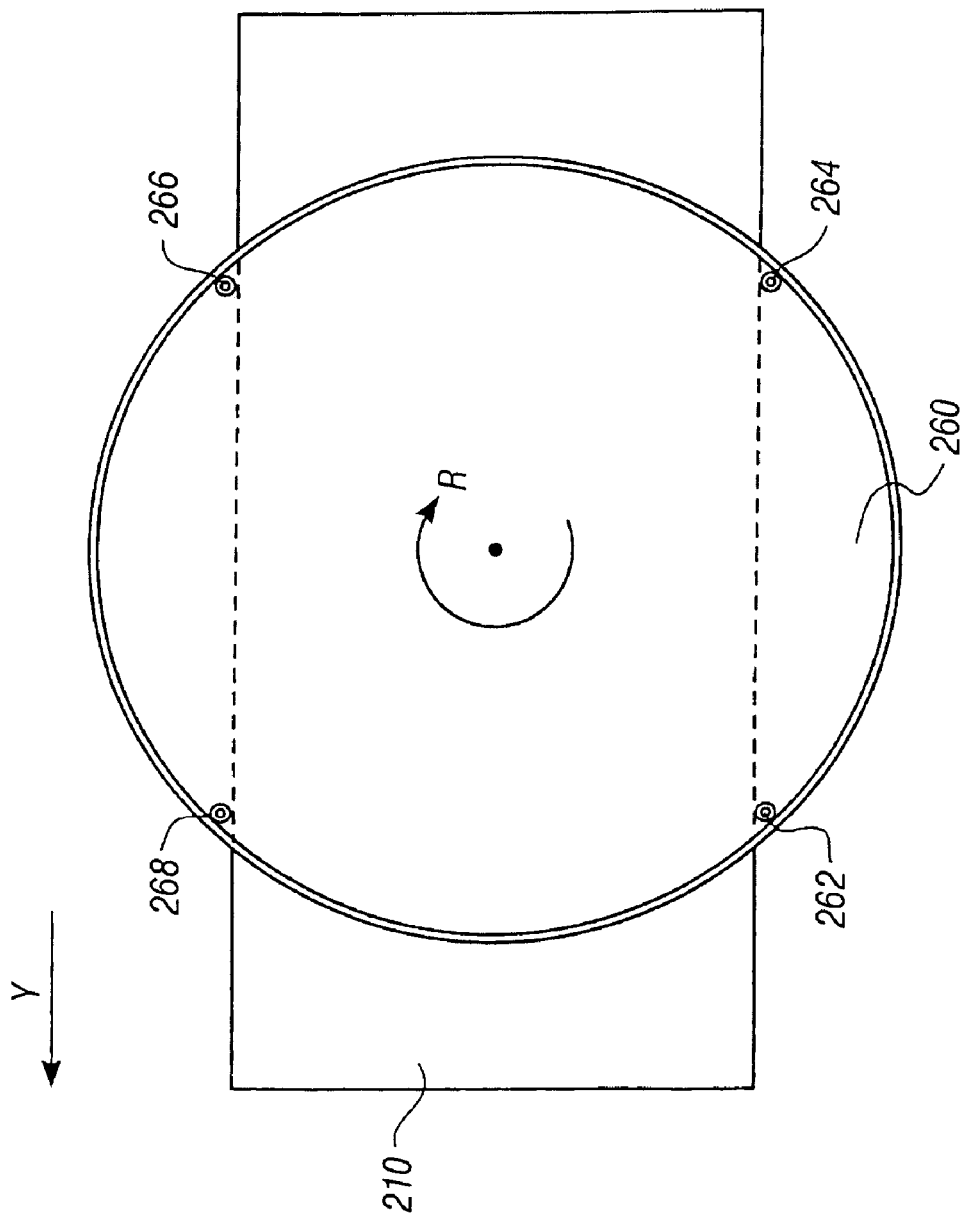
FIG. 11 shows a four head scanning device.

FIG. 11 shows a four head scanning device 260, having four scanning heads 262, 264, 266 and 268 which are equally spaced at 90.degree. to one another. Scanning device 260 is dimensioned to have a diameter greater than the width of screen 210, as shown, such that sufficiently straight scan lines can be taken as scanning head 262 moves to the position presently occupied by scanning head 268. An advantage of the four head scanner of FIG. 11 is that the system can be dimensioned with the ratio of scanner diameter to screen width set such that successive scan heads move into position and commence scanning across the screen at the moment in time when the preceding scanning head stops scanning as it passes off the surface of the phosphor screen, as shown.

Figure 12:
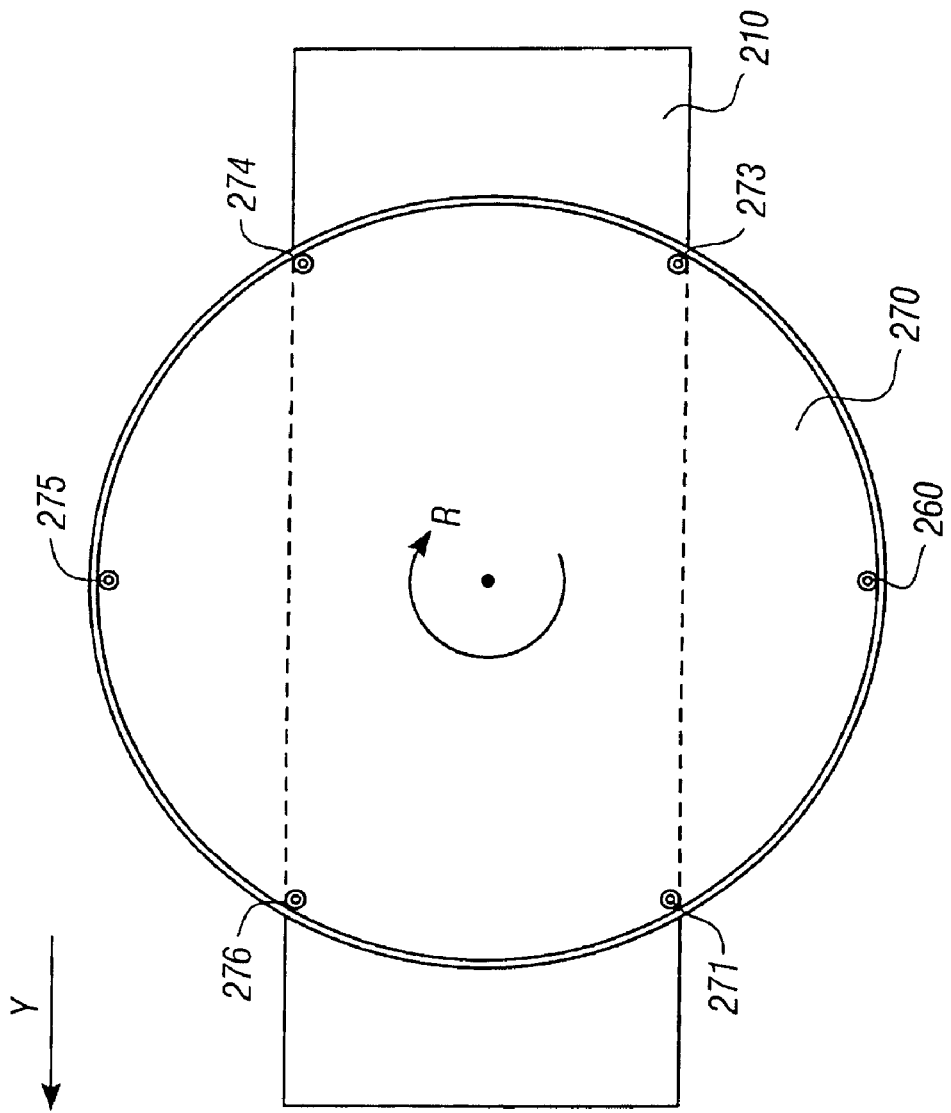
FIG. 12 shows a six head scanning device.

As can be appreciated, it is possible to add additional numbers of scanning heads. For example, a six head scanning device 270, having six equally spaced apart scanning heads 271, 272, 273, 274, 275, and 276 is shown in FIG. 12. By increasing the optical diameter of the rotary scanning device relative to the width of the phosphor screen, the scan lines are progressively straightened. By adding additional numbers of scanning heads, the advantage of avoiding gaps in data collection is achieved.

A number of different preferences, options, embodiment, and features have been given above, and following any one of these may results in an embodiment of this invention that is more presently preferred than a embodiment in which that particular preference is not followed. These preferences, options, embodiment, and features may be generally independent, and additive; and following more than one of these preferences may result in a more presently preferred embodiment than one in which fewer of the preferences are followed. It should be understood that other combinations of wavelength may be used, other than those set forth herein. It should be understood that any embodiment of present invention may be adapted for use with the system described in U.S. Pat. Nos. 6,268,613 and 6,355,938 fully incorporated herein by reference. U.S. Provisional Application Ser. No. 60/525,189 is incorporated herein by reference for all purposes. A variety of broadband and other light sources may be adapted for use with the present invention. It should be understood that although one embodiment uses a 460 nm source for pumping, the wavelengths may be moved further out such as, but not limited to: 400 nm, 350 nm, 300 nm, 250 nm, 200 nm, or shorter wavelengths for pumping. In some embodiments, the lasers of the present invention may be direct at adjacent positions on the screen so one pumps while the other soon reads the pumped location. Some embodiments may use a bimodal laser and can the bimodal laser at the same time.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. Any of the embodiments of the invention may be modified to include any of the features described above or feature incorporated by reference herein. By example and not limitation, the wavelength sources at specific wavelengths may be combined with other readout schemes as known in the art. Intermediate bands, triple combinations, or other ways of producing spectra instead of LEDs, Laser Diodes, and Lasers may also be used. Single sources may be designed to have tailored spectra, which provide both a pumping wavelength and an erase wavelength. By way of example and not limitation, single sources may be designed to have tailored spectrums which provide both a pumping wavelength and a readout wavelength. Colored wavelengths with at least one broadband source may be used. Some embodiments of the present invention may also direct pump wavelength and readout wavelength energy to the same screen and that energy may be directed to the same positions on the screen or to different positions of the same screen. In any of the above embodiments, the wavelength sources may direct energy sequentially onto the screen, it may occur simultaneously, or any combination of the two. Although the present application describes the present invention context of phosphor image screens, it should be understood that the present invention may be used with other image screens or other storage devices.

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited.

Expected variations or differences in the results are contemplated in accordance with the objects and practices of the present invention. It is intended, therefore, that the invention be defined by the scope of the claims, which follow, and that such claims be interpreted as broadly as is reasonable.

What is claimed is:

1. A method for improving signal readout from an image storage screen, said method comprising:
   exposing the screen to energy at a pumping wavelength; and
   exposing the screen to energy at a readout wavelength while collecting the phosphorescent signal to obtain image data from the storage screen.

2. The method as in claim 1 wherein:
   the screen is exposed to energy at a pumping wavelength while collecting the phosphorescent signal to prime the screen to improve signal readout.

3. The method as in claim 1 wherein said exposing to the pumping wavelength occurs prior to exposure of the screen to the readout wavelength.

4. The method as in claim 1 wherein one location on the screen is sequentially exposed to both pumping wavelength and readout wavelength.

5. The method as in claim 1 wherein image data is not received until the screen receives light at the readout wavelength.

6. The method as in claim 1 wherein one location the screen is exposed to pumping wavelength while an adjacent location on the screen is exposed to readout wavelength.

7. The method as in claim 1 wherein the screen is simultaneously exposed to both pumping wavelength and readout wavelength.

8. The method as in claim 1 wherein one location on the screen is simultaneously exposed to both pumping wavelength and readout wavelength.

9. The method as in claim 1 comprising exposing the screen to energy at a third wavelength.

10. The method as in claim 1 comprising using a broadband source for the pumping wavelengths.

11. The method as in claim 1 comprising use of a broadband source for the readout wavelengths.

12. The method as in claim 1 comprising using a single source having an energy output that is weighted to provide greater intensity at the pumping wavelengths and the erasing wavelengths.

13. The method as in claim 1 further comprising providing a laser light source to provide light at the pumping wavelength.

14. The method as in claim 1 further comprising providing a laser light source to provide light at the readout wavelength.

15. The method as in claim 1 wherein said pumping wavelength is about 460 nm.

16. The method as in claim 1 wherein said readout wavelength is about 640 nm.

17. The method as in claim 1 further comprising providing an optical train to direct output from a first laser light source and a second laser light source to the screen.

18. The method as in claim 1 further comprising providing a microprocessor with logic for controlling a first energy source to sequentially expose one location on the screen with light at a pump wavelength and controlling a second energy source to expose the location on the screen with light at a readout wavelength.

19. A storage screen readout device comprising:
   a first wavelength source;
   a second wavelength source;
   wherein said first wavelength is selected to pump signal on the screen to be more easily readout by said second wavelength source;
   a collector receiving the stimulated phosphorescence; and
   a driver used to create relative motion between the sources and the screen in order to obtain image information.

20. The device of claim 19 wherein the first and/or second source are laser diodes.

21. The device of claim 19 wherein the first and/or second source are lasers.

22. The device of claim 19 wherein the first and/or second source are LEDs.

23. The device of claim 19 wherein the first and/or second source emit a broad band of wavelengths.

24. The device of claim 19 wherein the first and/or second source comprise a multiplicity of wave bands.

25. The device of claim 19 wherein said first wavelength is about 460 nm.

26. The device of claim 19 wherein said second wavelength is about 640 nm.

27. The device of claim 19 further comprising provision of an optical coupler to direct light from the first wavelength source and the second wavelength source to the same location on the screen.

28. The device of claim 19 further comprising provision of means to alternate delivery of the sources to the screen.

29. The device of claim 19 further comprising provision of optical couplers to deliver the first and second wavelength to separate locations on the screen.

30. A multiple head scanning system having the device of claim 19 and further comprising:
- a rotatable frame having a center and an outer perimeter;
- at least one photomultiplier tube disposed at a location proximal the center of the rotatable frame;
- three radially extending optical trains mounted to the rotatable frame, each optical train configured to direct incident laser light towards the photostimulable medium and to direct response radiation emitted by the photostimulable medium in response to the incident laser light towards the photomultiplier tube, each optical train having a first wavelength source and a second wavelength source.

31. The system of claim 30 wherein each optical train comprises the first wavelength source and the second wavelength source controlled by a microprocessor to sequentially deliver energy to the same location on the screen.

32. The system of claim 30 wherein each optical train comprises the first wavelength source and the second wavelength source controlled by a microprocessor to simultaneously deliver energy to the same location on the screen.

33. A multiple head scanning system having the device of claim 19 and further comprising:
- a rotatable frame having a center and an outer perimeter;
- at least one photomultiplier tube disposed at a location proximal the center of the rotatable frame;
- three radially extending optical trains mounted to the rotatable frame at 120 degrees to one another, each optical train configured to direct incident laser light towards the photostimulable medium and to direct response radiation emitted by the photostimulable medium in response to the incident laser light towards the photomultiplier tube, each optical train having a first wavelength source providing light at a readout wavelength; and
- each optical train having an adjacent optical train for directing light from a second wavelength source to the medium at a location adjacent to the location receiving light from the first source.

* * * * *